(12) United States Patent
Ota et al.

(10) Patent No.: US 6,683,752 B2
(45) Date of Patent: Jan. 27, 2004

(54) TAPE CASSETTE

(75) Inventors: Shuichi Ota, Saitama (JP); Sunao Kushiro, Chiba (JP)

(73) Assignee: Sony Corporation, Tokyo (JP)

( * ) Notice: Subject to any disclaimer, the term of this patent is extended or adjusted under 35 U.S.C. 154(b) by 264 days.

(21) Appl. No.: 09/894,606

(22) Filed: Jun. 28, 2001

(65) Prior Publication Data

US 2002/0018319 A1 Feb. 14, 2002

(30) Foreign Application Priority Data

Jun. 30, 2000 (JP) ........................................ 2000-199011

(51) Int. Cl.[7] .............................................. G11B 23/04
(52) U.S. Cl. ................................. 360/132; 242/347.2
(58) Field of Search ................................ 360/132, 137, 360/96.5; 242/341, 347, 347.2, 346, 357

(56) References Cited

U.S. PATENT DOCUMENTS

| 3,768,814 | A | * | 10/1973 | Sato | ........................ 360/96.5 |
| 5,796,563 | A | * | 8/1998 | Iwano et al. | ................. 360/132 |
| 5,963,538 | A | * | 10/1999 | Koshiyouji | ................. 369/291 |
| 6,224,007 | B1 | * | 5/2001 | Kaku et al. | ............... 242/338.4 |

* cited by examiner

Primary Examiner—William Korzuch
Assistant Examiner—Angel Castro
(74) Attorney, Agent, or Firm—Frommer Lawrence & Haug LLP; William S. Frommer; Leonard J. Santisi

(57) ABSTRACT

Disclosed is a tape cassette in which two positioning holes is formed in the back surface of a cassette shell. One of the two positioning holes is formed into a circular shape and the other is formed into a long-hole shape. The positioning hole formed into the long-hole shape is divided into two parts in the major direction of the long-hole. An about half of the long-hole shape is used as a positioning hole and an about remaining half thereof is used as an information detecting (ID) hole for providing various kinds of information. A removable block piece is provided on an opening portion of said ID hole. With this configuration, the ID hole can be surely provided in the tape cassette, even if the tape cassette is miniaturized.

7 Claims, 29 Drawing Sheets

FIG. 16A
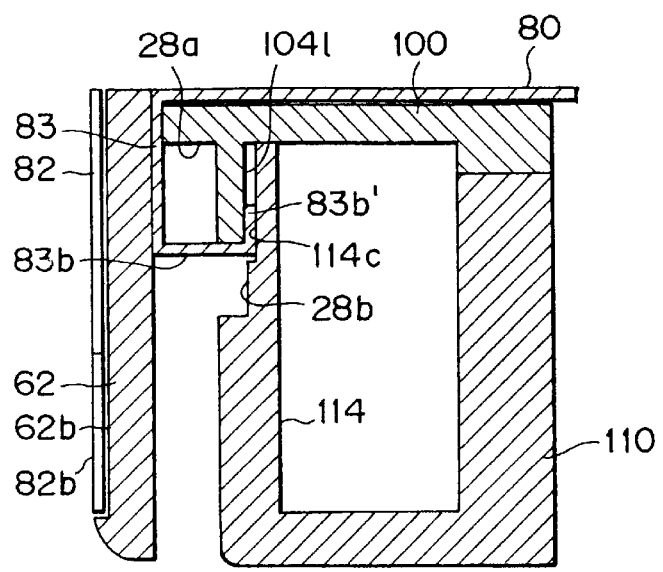
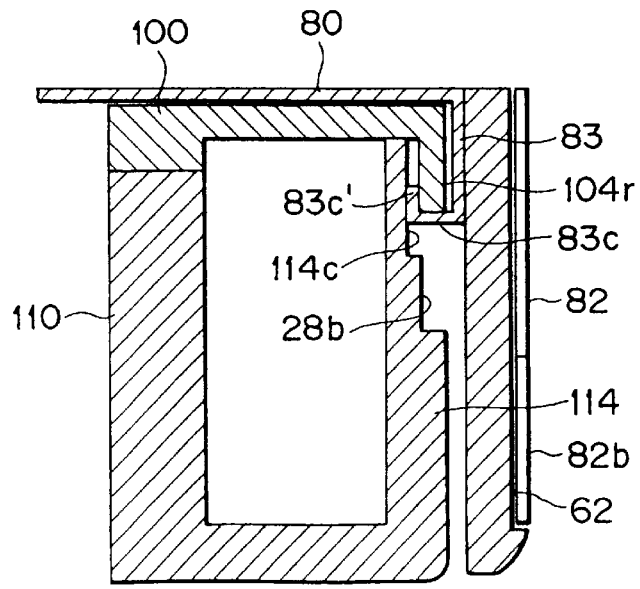
FIG. 16B

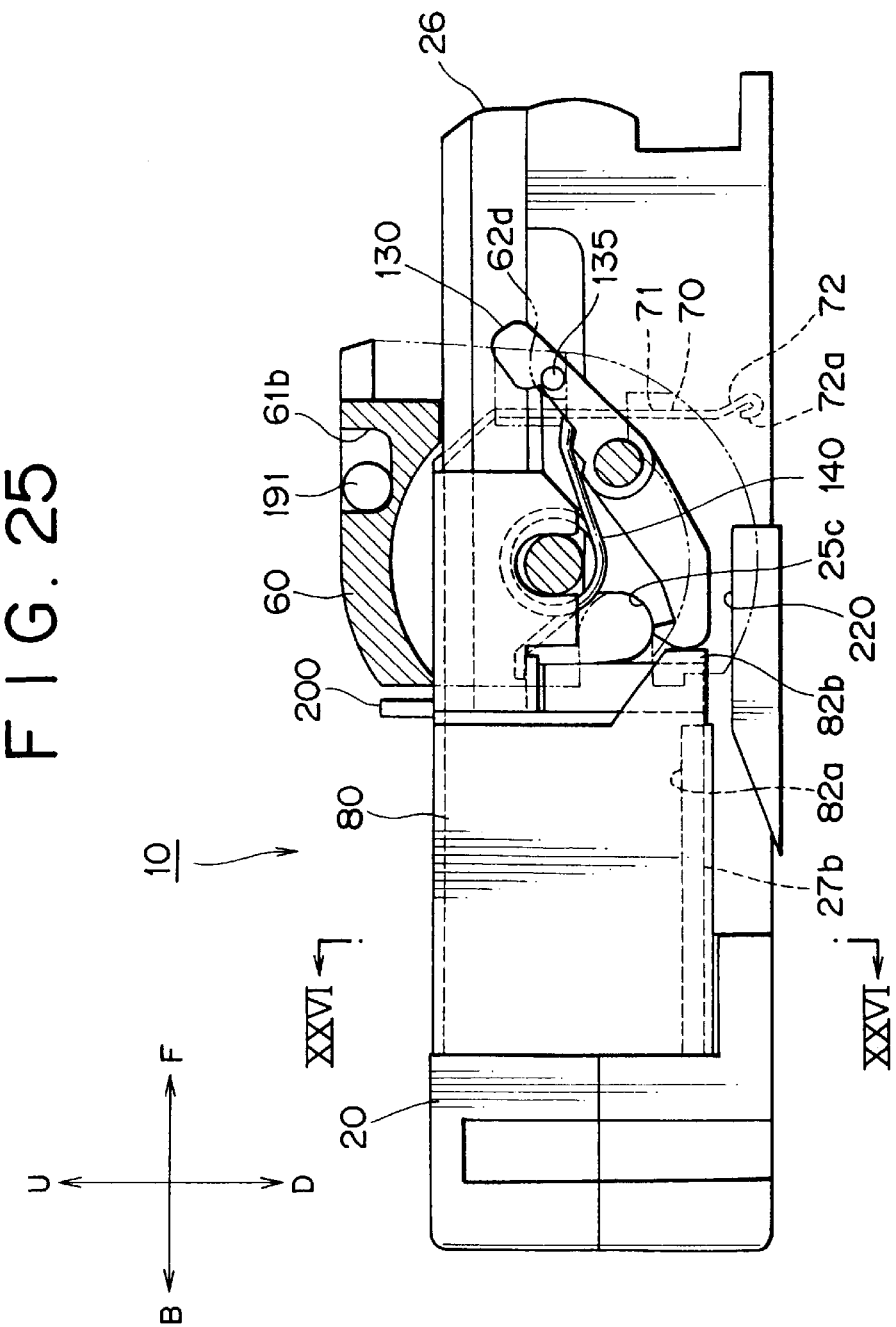

TAPE CASSETTE

BACKGROUND OF THE INVENTION

The present invention relates to a new tape cassette, and particularly to a technique suitable for a miniaturized tape cassette, which allows formation of a positioning hole for positioning the tape cassette to a tape drive apparatus and an ID hole for providing various kinds of information.

Tape cassettes are configured such that two reels around which a magnetic tape is wound are rotatably contained in a cassette shell generally composed of a lower shell and an upper shell.

The lower shell of the cassette shell has two positioning holes for positioning the tape cassette to a tape drive apparatus when the tape cassette is loaded in the tape drive apparatus, and also has an ID hole for detecting various kinds of information on the tape cassette.

On the other hand, a tape drive apparatus is provided with two positioning pins, which are inserted in the two positioning holes of the tape cassette, to perform the positioning of the tape cassette to the tape drive apparatus. The tape drive apparatus is also provided with a detecting means such as a detecting switch at a position corresponding to that of the ID hole of the tape cassette. It is detected, by turn-on/turn-off of the detecting switch, whether or not the ID hole is opened, to thereby detect various kinds of information on the tape cassette.

In recent years, however, the following problem associated with the positioning holes and ID hole has occurred: namely, although the amount of information necessary for a tape cassette tends to be increased depending on multiplicity of recording methods and recording densities, spaces required for forming the positioning holes and ID hole in the cassette shell have become narrower along with the tendency toward miniaturization of the tape cassette.

SUMMARY OF THE INVENTION

An object of the present invention is to provide a tape cassette which is capable of surely providing an ID hole in the tape cassette, even if the tape cassette is miniaturized.

To achieve the above object, according to the present invention, there is provided a tape cassette including a cassette shell which has, in the back surface, two positioning holes wherein one of the two positioning holes is formed into a circular shape and the other is formed into a long-hole shape, the positioning hole formed into the long-hole shape is divided into two parts in the major direction of the long-hole, and about half of the long-hole shape is used as a positioning hole and about remaining half thereof is used as an information detecting (ID) hole for providing various kinds of information and a removable block piece is provided on an opening portion of the ID hole.

With this configuration, one of the positioning holes and the ID hole are provided in the common long-hole. Accordingly, as compared with the related art structure in which the ID hole is provided separately from a positioning hole, the structure of the present invention is advantageous in that it is not required to ensure an additional space specialized for the ID hole separately from a space for the positioning hole. As a result, it is possible to make effective use of an inner space of the cassette shell and hence to contribute to miniaturization of the tape cassette.

In this tape cassette, preferably, a connection piece is provided for connecting an edge portion, on the positioning hole side, of the block piece to a bottom plate of the positioning hole.

With this configuration, even if a member near the block piece, such as a positioning pin, is brought into contact with the block piece in a state in which the ID hole is closed, the block piece can be prevented from being easily cutout by contact therewith. That is to say, since the provision of the connection piece allows only intentional cutout of the block piece, it is possible to prevent erroneous recognition of the ID hole.

BRIEF DESCRIPTION OF THE DRAWINGS

FIGS. 15A and 15B are enlarged sectional views taken on line XV—XV of FIG. 14, wherein FIG. 15A shows a left end portion and FIG. 15B shows a right end portion;

FIGS. 16A and 16B are enlarged sectional views taken on line XVI—XVI of FIG. 14, wherein FIG. 16A shows a left end portion and FIG. 16B shows a right end portion;

FIGS. 17A and 176B are enlarged sectional views taken on line XVII—XVII of FIG. 14, wherein FIG. 17A shows a left end portion and FIG. 17B shows a right end portion;

FIG. 25 is a schematic side view of the tape cassette, with an essential portion cutaway, showing a state in which the slider is retreated and both the front lid and back lid reach the opened positions;

FIGS. 26A and 26B are enlarged sectional views taken on line XXVI—XXVI of FIG. 25, wherein FIG. 25A shows a left end portion and FIG. 25B shows a right end portion;

DETAILED DESCRIPTION OF THE PREFERRED EMBODIMENT

Hereinafter, an embodiment of a tape cassette of the present invention will be described with reference to the accompanying drawings.

Figure 1:
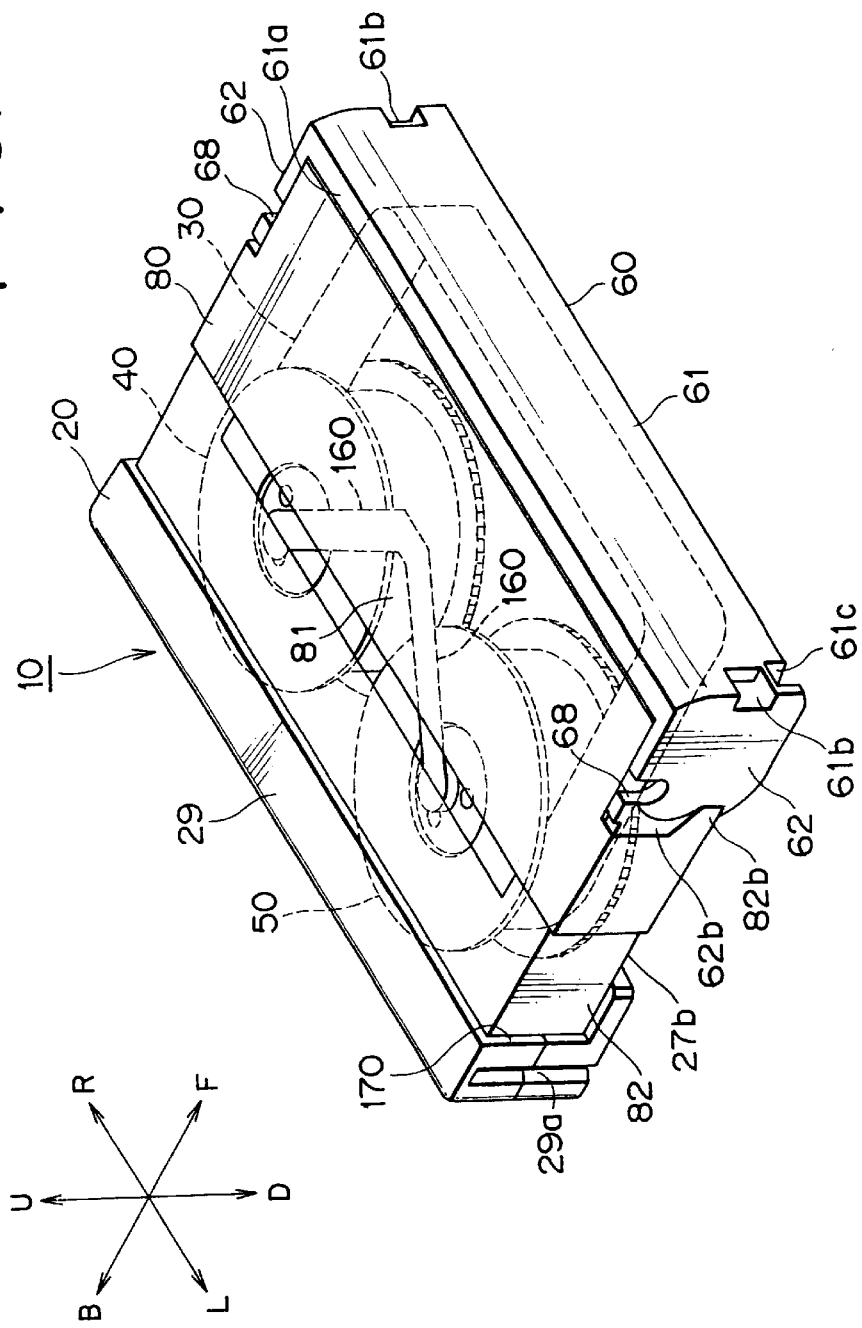
FIG. 1 is a perspective view of an embodiment of a tape cassette of the present invention, showing a state in which a front lid is located at a closed position.
Figure 2:
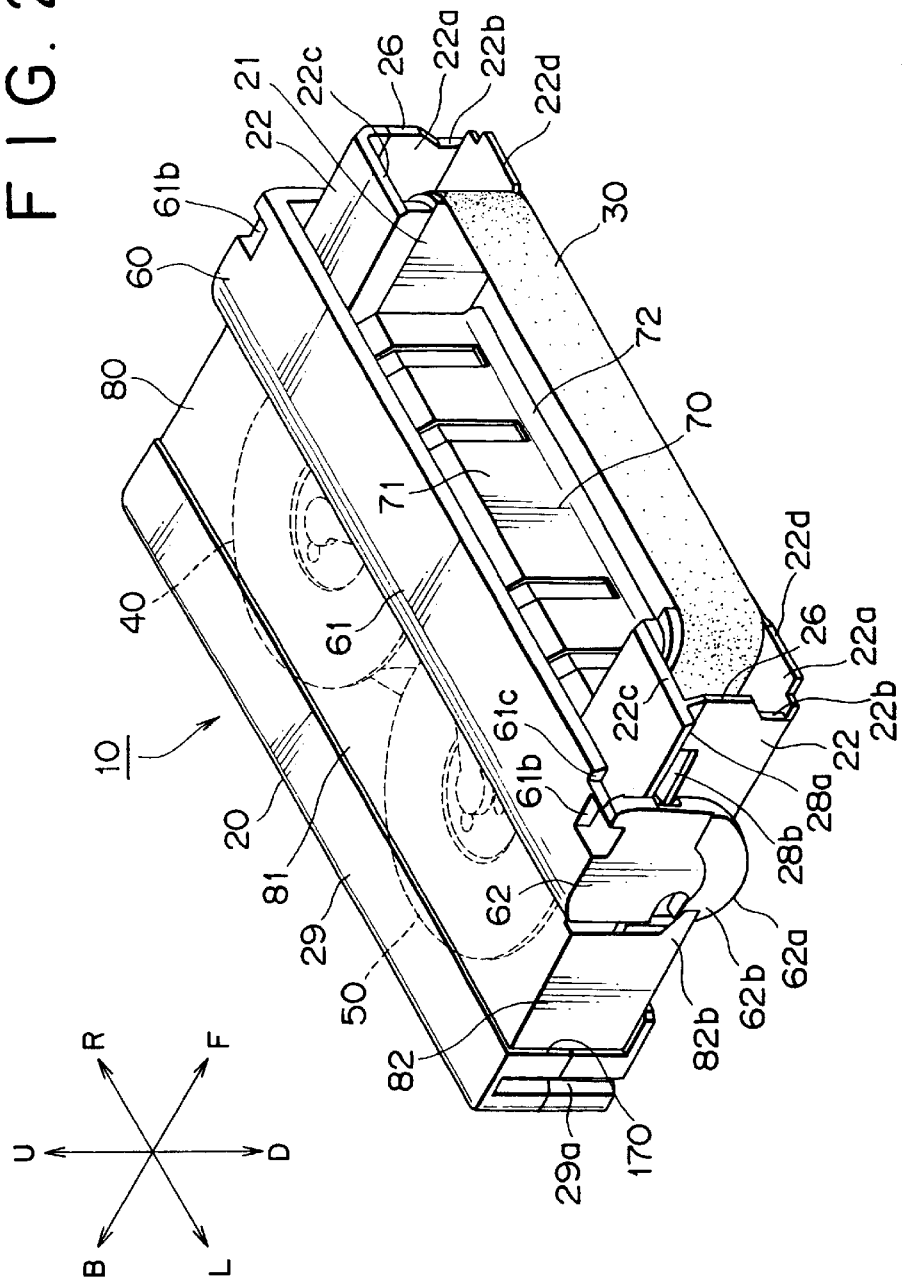
FIG. 2 is a perspective view of the tape cassette, showing a state in which the front lid and a back lid are both located at opened positions.
Figure 8:
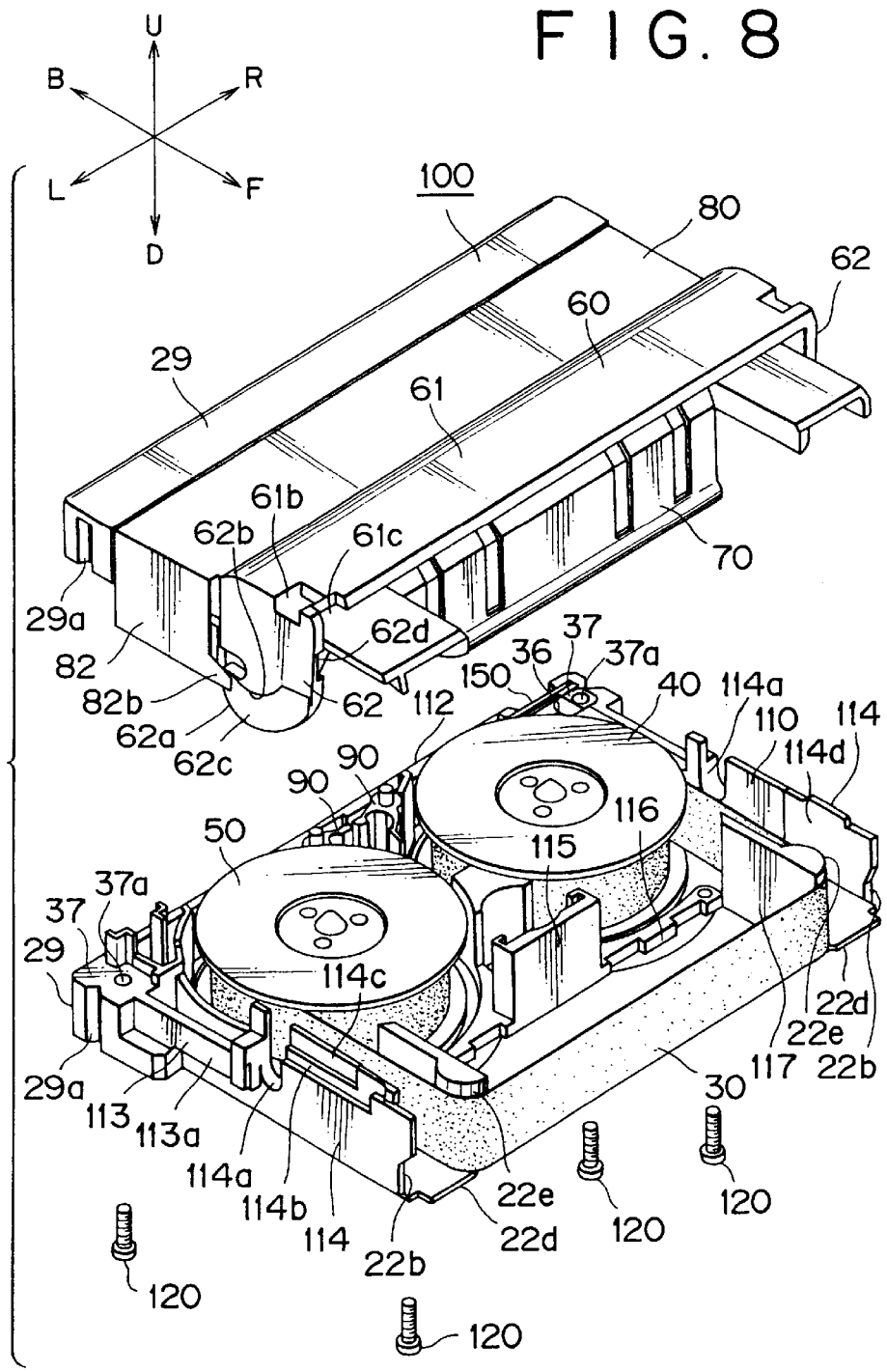
FIG. 8 is a perspective view of the upper shell unit in which the slider unit has been assembled and the lower shell unit, which are in a state before being assembled to each other.

Referring to FIGS. 1, 2 and 8, a tape cassette 10 has a thin-box shaped cassette shell 20. Tape reels 40 and 50, around which a magnetic tape 30 representative of a tape-like recording medium is wound, are rotatably contained in the cassette shell 20. The tape cassette 10 also has a front lid 60 for covering the front surface side of the magnetic tape 30 positioned along the front surface of the cassette shell 20, and a back lid 70 for covering the back side of the magnetic tape 30. A slider 80 is supported on the cassette shell 20 in such a manner as to be movable back and forth. The back lid 70 is integrally formed on the slider 80, and the front lid 60 is turnably supported at a front end portion of the slider 80.

In the figures, characters U, D, L, R, F, and B designate the upward direction, downward direction, leftward direction, rightward direction, forward direction, and backward direction, respectively.

The thin-box shaped cassette shell 20 is made from a plastic material, so that the whole thereof is made transparent, or a portion thereof is made transparent (see FIG.1) through which the tape reels 40 and 50 are to be entirely or partly viewed from above.

As shown in FIG. 2, a large recess 21, called a mouth portion, is formed in a front portion of the cassette shell 20. The mouth portion 21 is opened forwardly, upwardly, and downwardly.

Figure 4:
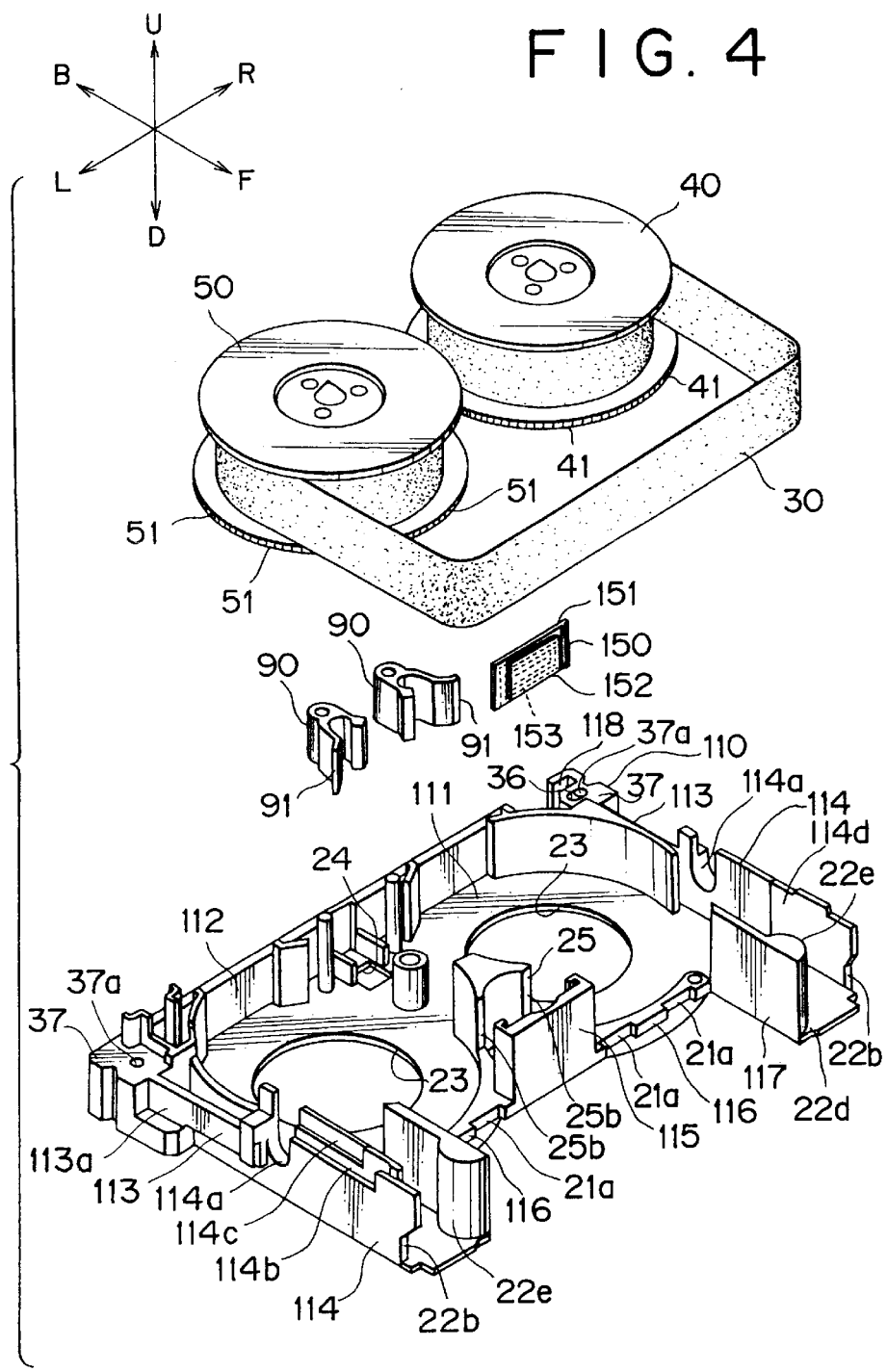
FIG. 4 is an exploded perspective view of a lower shell unit of the tape cassette.
Figure 5:
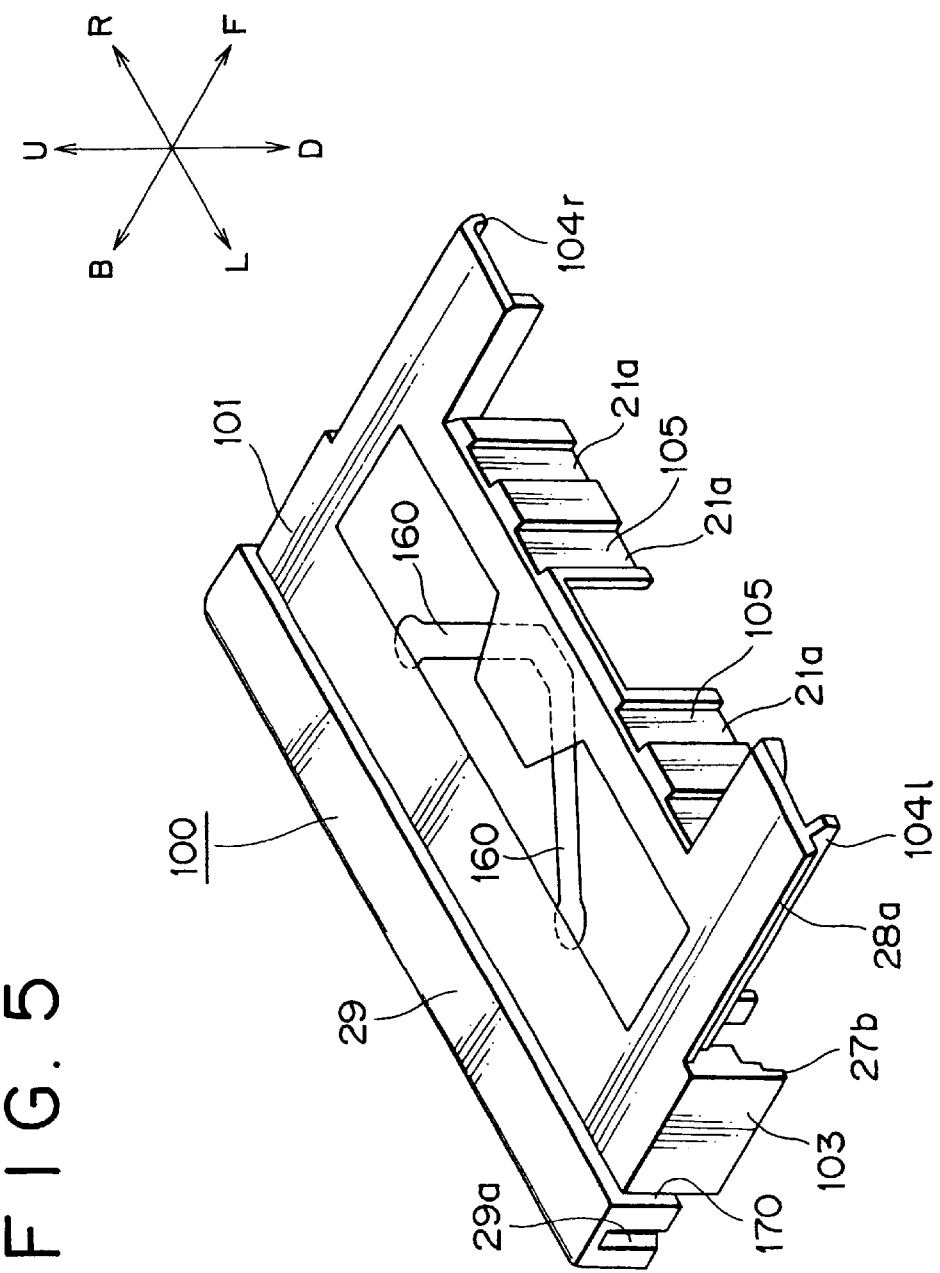
FIG. 5 is a perspective view of an upper shell unit of the tape cassette.

The depth surface of the mouth portion 21 has, at an area excluding portions facing to the maximum outside diameter portions of the tape reels 40 and 50, a plurality of stripe-like recesses 21a extending in the vertical direction (see FIGS. 4 and 5).

As shown in FIG. 2, a tape extraction portion 22 formed into a square cylinder is provided on each of the mouth portion 21 of the cassette shell 20. A front end 22a of the tape extraction portion 22 is opened. The magnetic tape 30 is extracted to the outside from the openings 22a of the tape extraction portions 22, and is stretched between the openings 22a in such a manner as to cross the front surface of the mouth portion 21.

Referring to FIG. 4, a pair of right and left reel base insertion holes 23 are formed in a bottom wall of the cassette shell 20. Engagement holes 40a and 50a (see FIG. 3) of the tape reels 40 and 50 are opened downwardly through the reel base insertion holes 23. When the tape cassette 10 is loaded in a tape drive apparatus (not shown), reel bases provided on the tape drive apparatus are inserted in the cassette shell 20 through the reel base insertion holes 23 and reel engagement shafts provided on the reel bases are engaged in the engagement holes 40a and 50a of the tape reels 40 and 50, and at the same time, the tape reels 40 and 50 are mounted on the reel bases.

Referring to FIG. 4, two reel lock members 90 are disposed on a rear central portion of the inner side of the cassette shell 20. In the non-loading state of the tape cassette 10, claws 91 of the reel lock members 90 are engaged with pluralities of engagement projections 41 and 51 formed on lower flanges of the tape reels 40 and 50, respectively, in order to prevent accidental rotation of the tape reels 40 and 50. The reel lock members 90 are biased in the direction of locking the tape reels 40 and 50 by springs (not shown). When the tape cassette 10 is loaded in a tape drive apparatus (not shown), a lock releasing pin provided on the tape drive apparatus is inserted in an insertion hole 24 formed in the bottom surface of the cassette shell 20, to turn the reel lock members 90 in the lock releasing direction, whereby the locking of the tape reels 40 and 50 by the reel lock members 90 are released.

Figure 9:
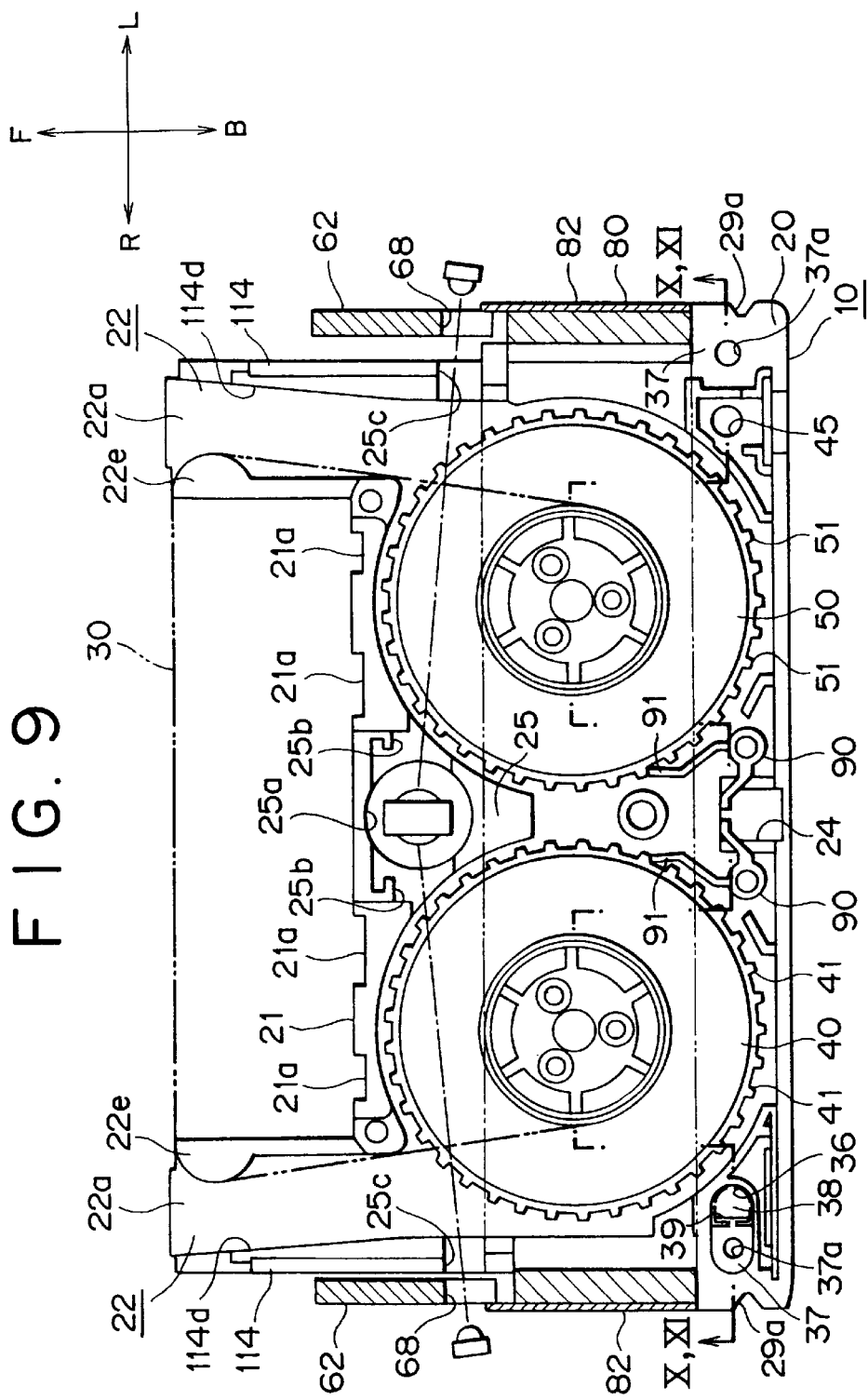
FIG. 9 is a schematic horizontal sectional view of the tape cassette.

As shown in FIG. 9, a shading cylinder 25 is formed inside a central portion in the lateral direction of the depth surface of the mouth portion 21 of the cassette shell 20. The shading cylinder 25 has, in its bottom surface, an opening 25a and has, in its right and left surfaces, cutouts 25b.

A translucent hole 25c is formed in each side wall of the cassette shell 20 at a position offset slightly forwardly from the center (see FIG. 9). The cutouts 25b of the shading cylinder 25 can be viewed from the translucent holes 25c.

Referring to FIG. 2, the tape extraction portion 22 has, at its front end (opening) 22a, an outer side front end surface 22b, an inner side front end portion to be described later, an upper side front end surface 22c, and a lower side front end surface 22d. A cam portion 26 extending forwardly is formed on an approximately upper half of the outer side front end surface 22b. The outer side front end surface 22b is retreated slightly rearwardly from the inner, upper, and lower side front end surfaces. When the tape cassette 10 is inserted in a cassette holder (not shown), the outer side front end surfaces 22b, the upper side front end surfaces 22c, and the lower side front end surfaces 22d of both the tape extraction portions 22 are brought into contact with a stopper provided on the cassette holder, to thus act as a forward movement stopper for limiting the insertion of the tape cassette 10 in the cassette holder.

An in-cassette guide 22e having a semi-cylindrical shape is formed on the inner side wall surface of the tape extraction port 22 in such a manner as to extend to the above-described inner side front end portion of the opening 22a. In the non-loading state of the tape cassette 10, as shown in FIG.

8, the magnetic tape 30 is stretched between the tape extraction portions 22 in a state being wound around the in-cassette guides 22e.

Figure 17A:
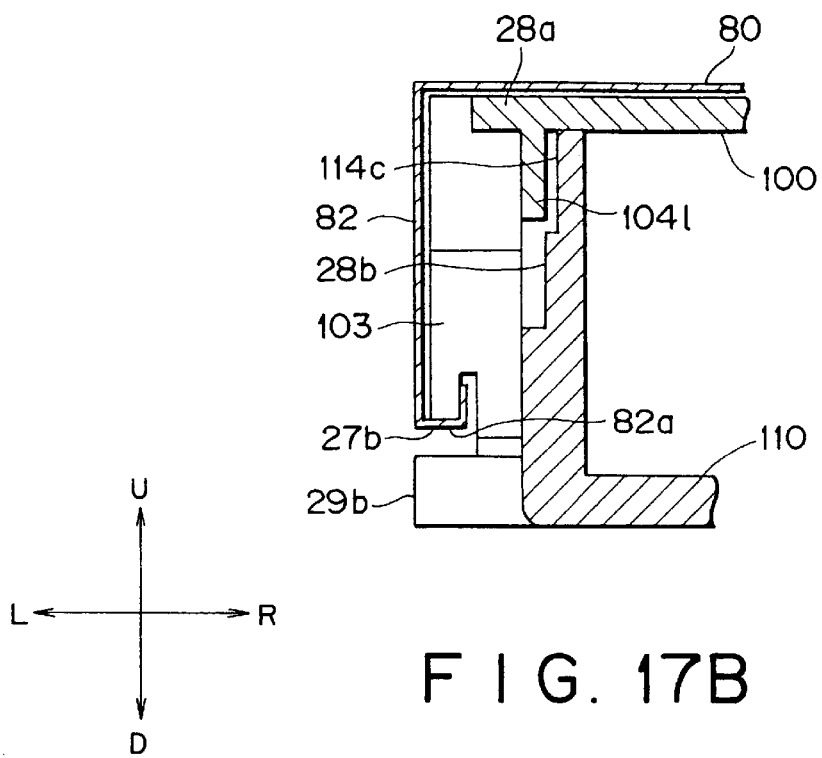
Figure 17B:
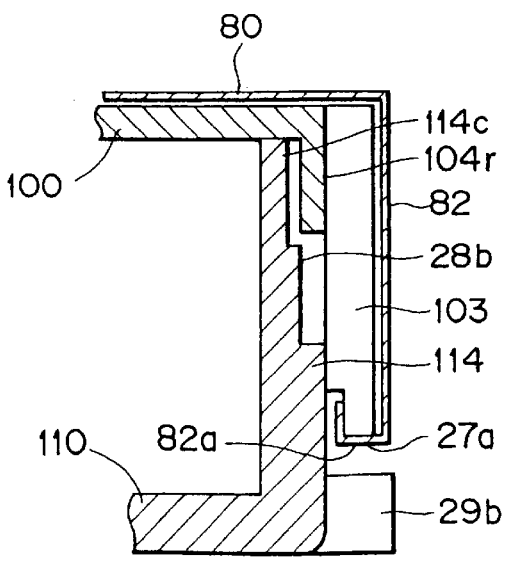
Figure 18:
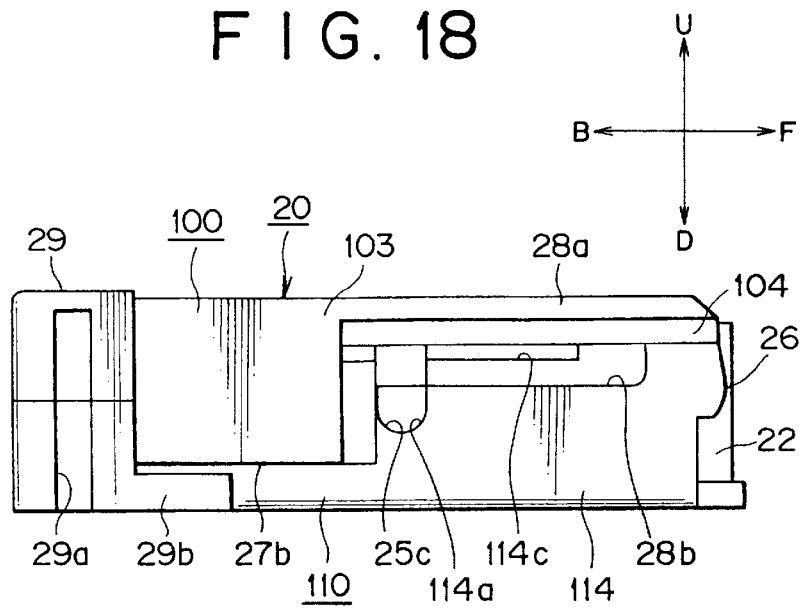
FIG. 18 is a left side view of a cassette shell of the tape cassette.
Figure 19:
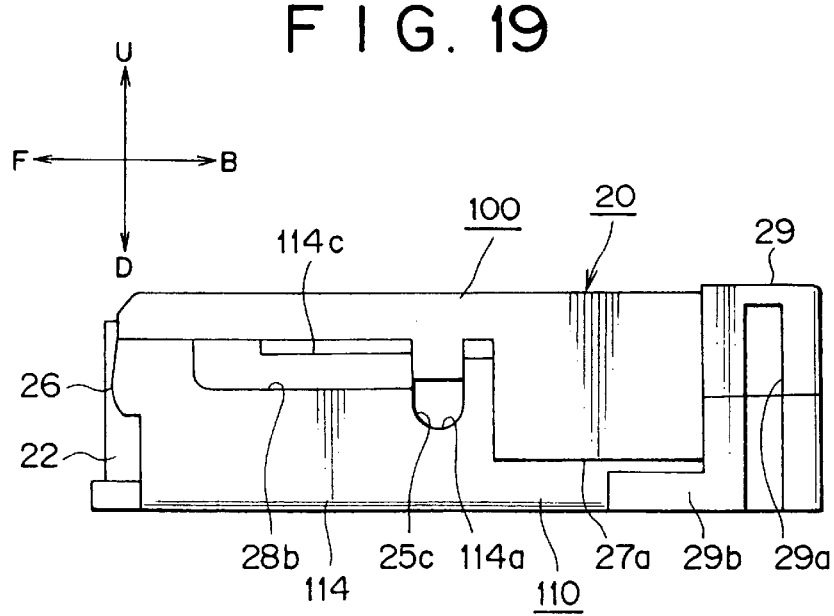
FIG. 19 is a right side view of the cassette shell.

Referring to FIGS. 17, 18 and 19, an approximately rear half of the right side surface of the cassette shell 20 has, at a position near the lower end, a downward step portion 27a extending in the longitudinal direction, and an approximately rear half of the left side surface of the cassette shell 20 has, at a position near the lower end, a downward step portion 27b extending in the longitudinal direction. An inner end portion of each of the step portions 27a and 27b has a groove.

Figure 15A:
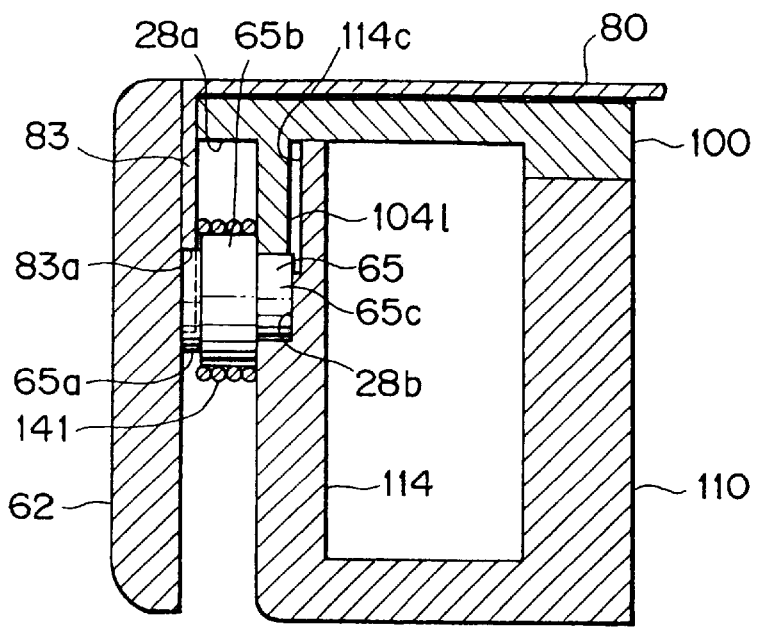

With respect to each of the right and left side surfaces of the cassette shell 20, as shown in FIGS. 2 and 15A, an approximately front half of the side surface is retreated slightly inwardly from the rear half of the side surface. The retreated degree on the left side is larger than that on the right side, and a hood-like portion 28a projecting outwardly is formed on an upper end of the front half on the left side surface.

Figure 14:
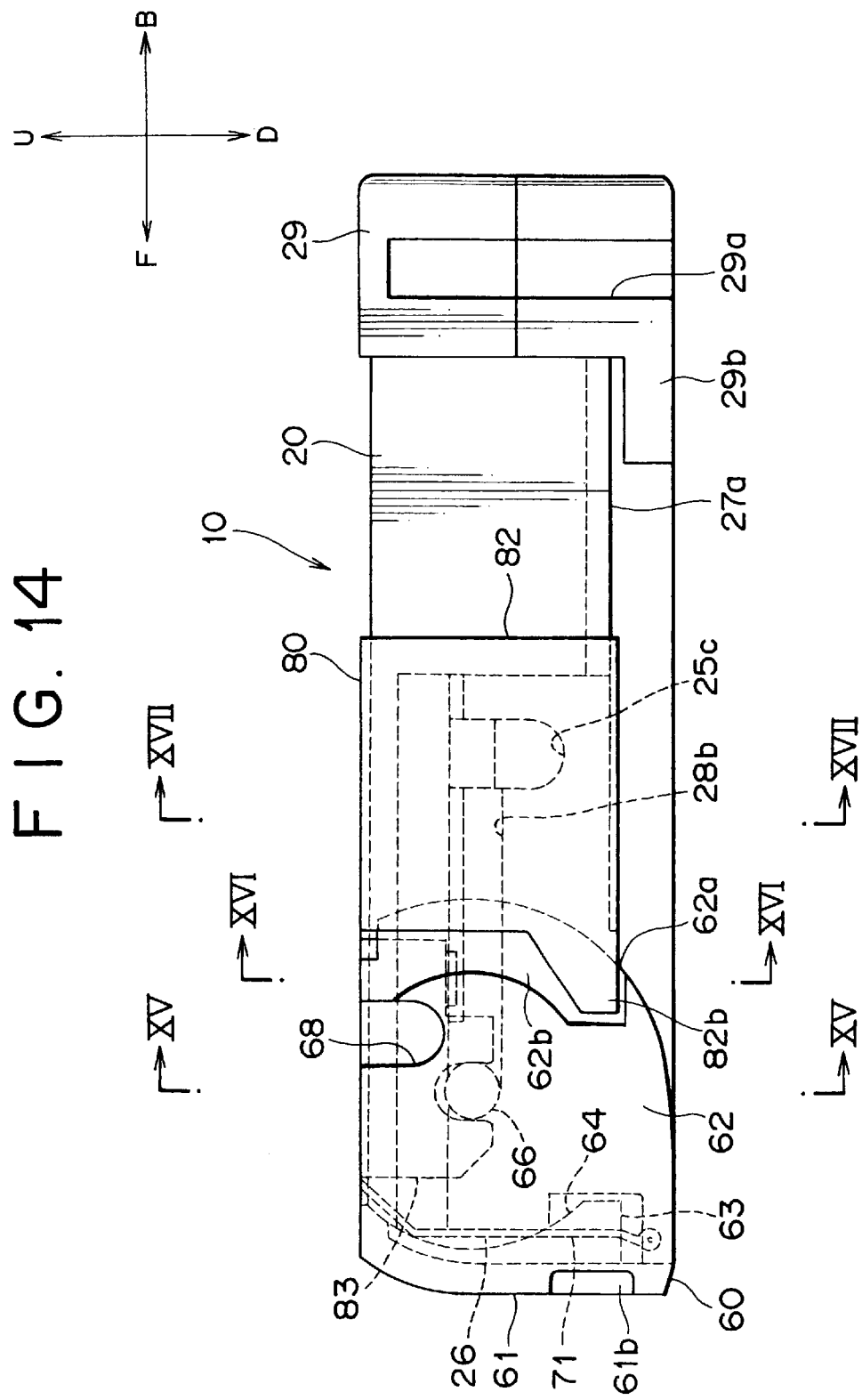
FIG. 14 is a right side view of the tape cassette.

Each of the right and left side surfaces of the cassette shell 20 has, at a position near the upper end, a sliding groove 28b extending from the front end to the translucent hole 25c (see FIGS. 14, 18 and 19).

As a shown in FIGS. 1 and 2, a projection 29 is formed on a rear end portion of the cassette shell 20 in such a manner as to project leftwardly, rightwardly, and upwardly therefrom. Each of right and left side surfaces of the projection 29 has a groove 29a extending from a position near the upper end to the lower end. As shown in FIGS. 14, 17, 18 and 19, a projecting rib 29b is formed on the lower end of the projection 29 in such a manner as to project slightly forwardly therefrom. A very small gap is formed between the upper end of the projecting rib 29b and each of the above-described step portions 27a and 27b.

Figure 3:
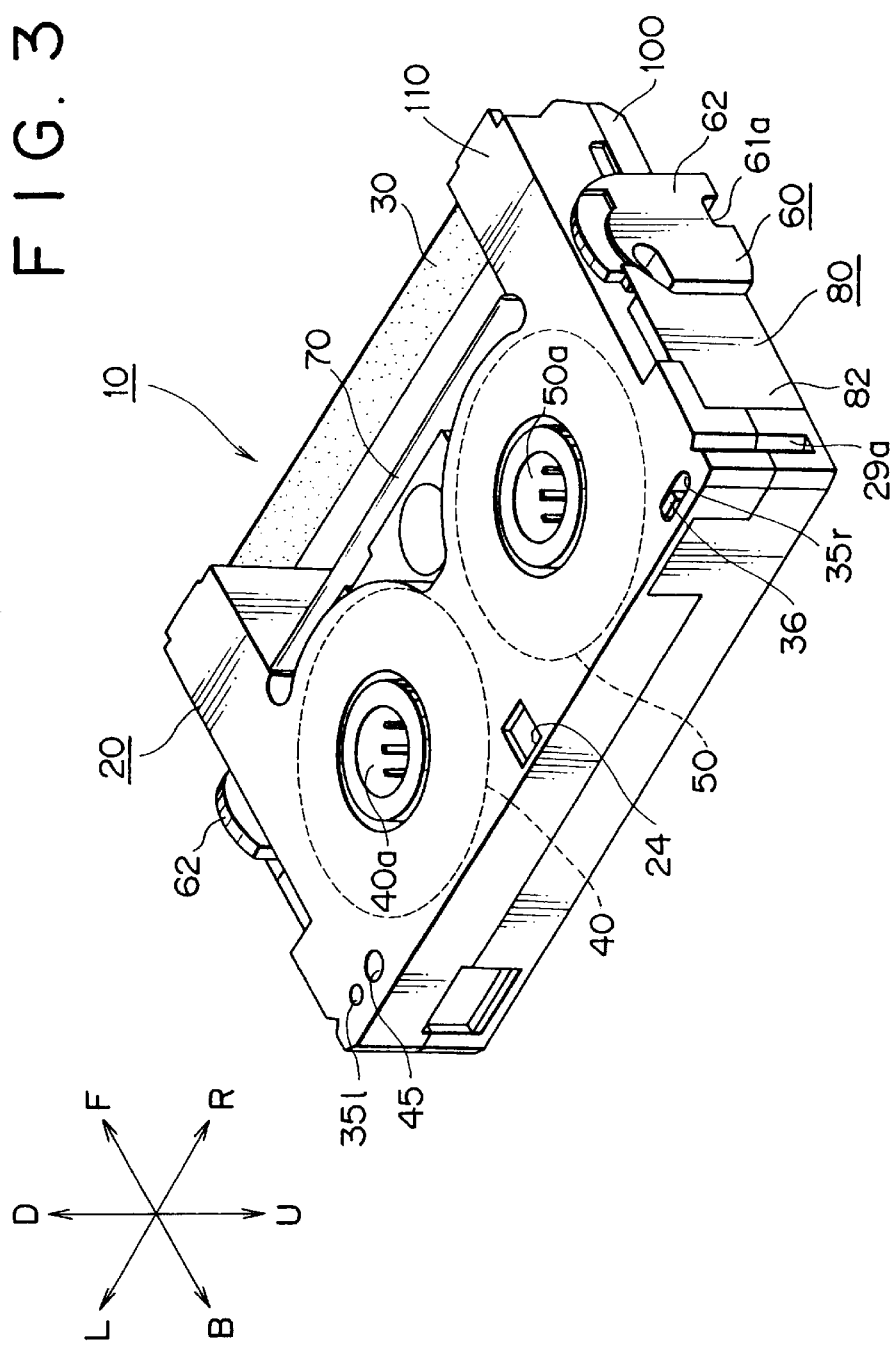
FIG. 3 is a perspective view, seen from below, of the tape cassette, showing a state in which the lids are located at the opened positions.

Referring to FIGS. 3 and 9, positioning holes 35r and 35l are formed in right and left corners of a rear portion of the bottom surface of the cassette shell 20, respectively. The left positioning hole 35l is formed into a circular shape which functions as a reference hole, and the right positioning hole 35r is formed into a long-hole shape being longer in the lateral direction. To be more specific, as shown in FIGS. 10 to 13, the right positioning hole 35r is a right half of the above-described long-hole, and the left half of the long-hole functions as an ID hole 36 to be described later.

Figure 12:
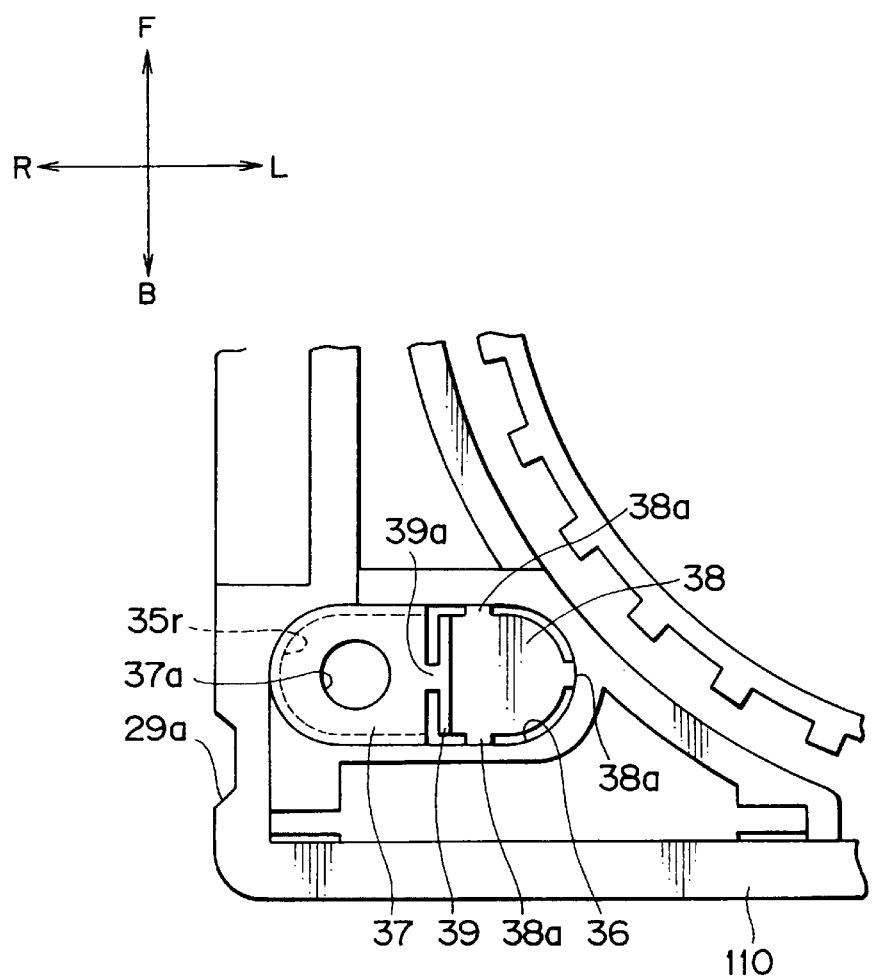
FIG. 12 is an enlarged plan view of an essential portion of a lower shell of the tape cassette.
Figure 13:
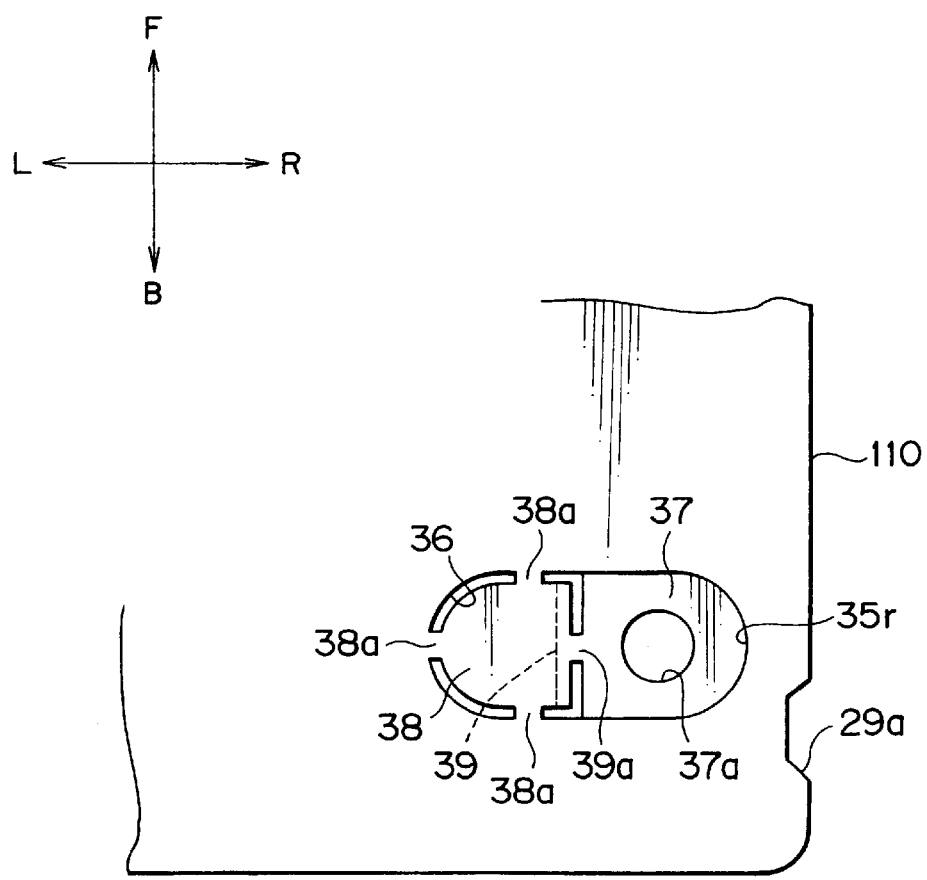
FIG. 13 is an enlarged bottom view of an essential portion of the lower shell.

Referring to FIGS. 12 and 13, each of the positioning holes 35l and 35r is closed with a bottom plate 37 having a small hole 37a. Two of screws 120 (which will be described later) for connecting the upper shell 100 to the lower shell 110 are inserted in the small holes 37a. In addition, the bottom plate 37 of the right positioning hole 35r does not extend up to a portion corresponding to the ID hole 36. That is to say, the bottom plate 37 is formed only on the right half side of the long-hole.

With respect to the long-hole composed of the right positioning hole 35r and the ID hole 36, the length of the long-hole in the major direction is longer than twice the length of the long-hole in the minor direction. As described above, the bottom plate 37 is formed on the right half side of the long-hole, and a block piece 38 is formed on the left half side of the long-hole in such a manner as to cover the opening of the ID hole 36 (see FIGS. 10 to 13).

The block piece 38 has, at three points of its peripheral edge, very-small pieces 38a connected to the left side inner peripheral edge of the long-hole. The block piece 38 also has, at its right edge, a connection piece 39 which extends upwardly while being in proximity to the bottom plate 37. The upper edge of the connection piece 39 is connected to the left edge of the bottom plate 37 with a small piece 39a (see FIGS. 10 to 13).

The block piece 38 and the connection piece 39 can be cut out of the cassette shell 20 by breaking the small pieces 38a and 39a, to open the ID hole 36. The opening of the ID hole 36 is detectable by a detecting switch to be described later (see FIG. 11).

Figure 10:
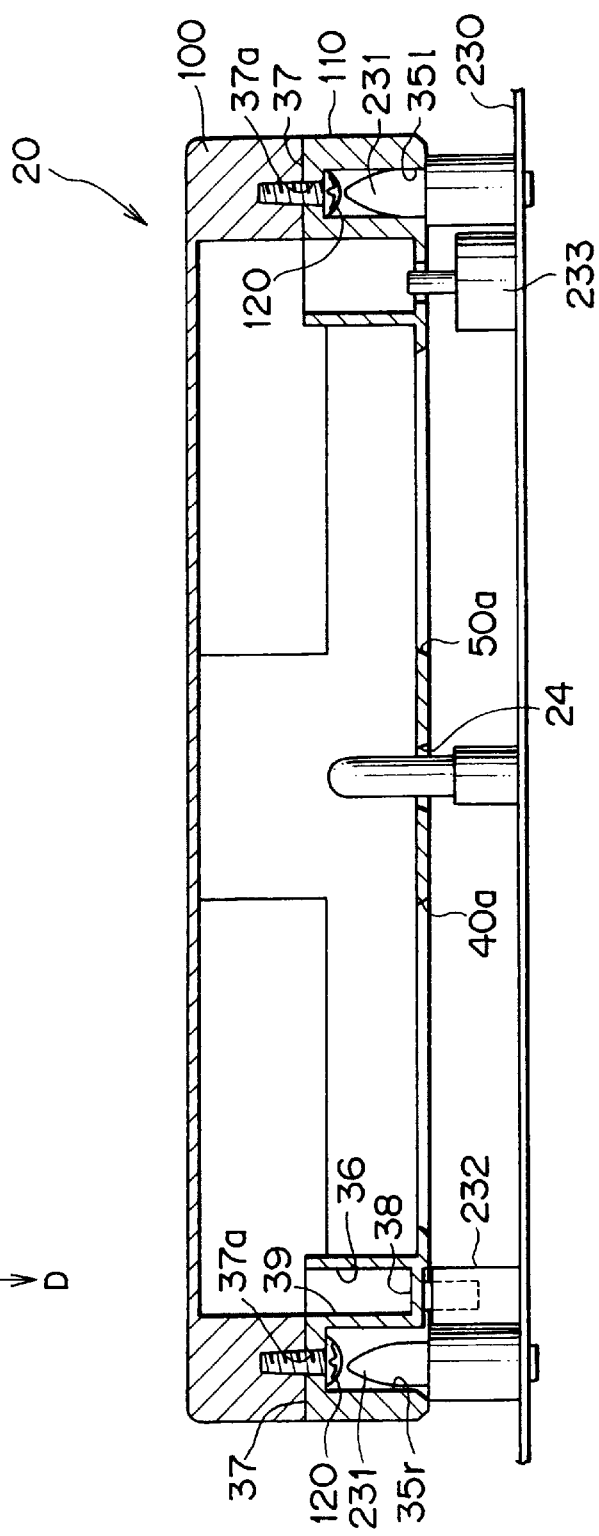
FIG. 10 is a sectional view, taken on line X—X of FIG. 9, of the tape cassette loaded in a tape drive apparatus, showing a state in which an ID hole is closed.
Figure 11:
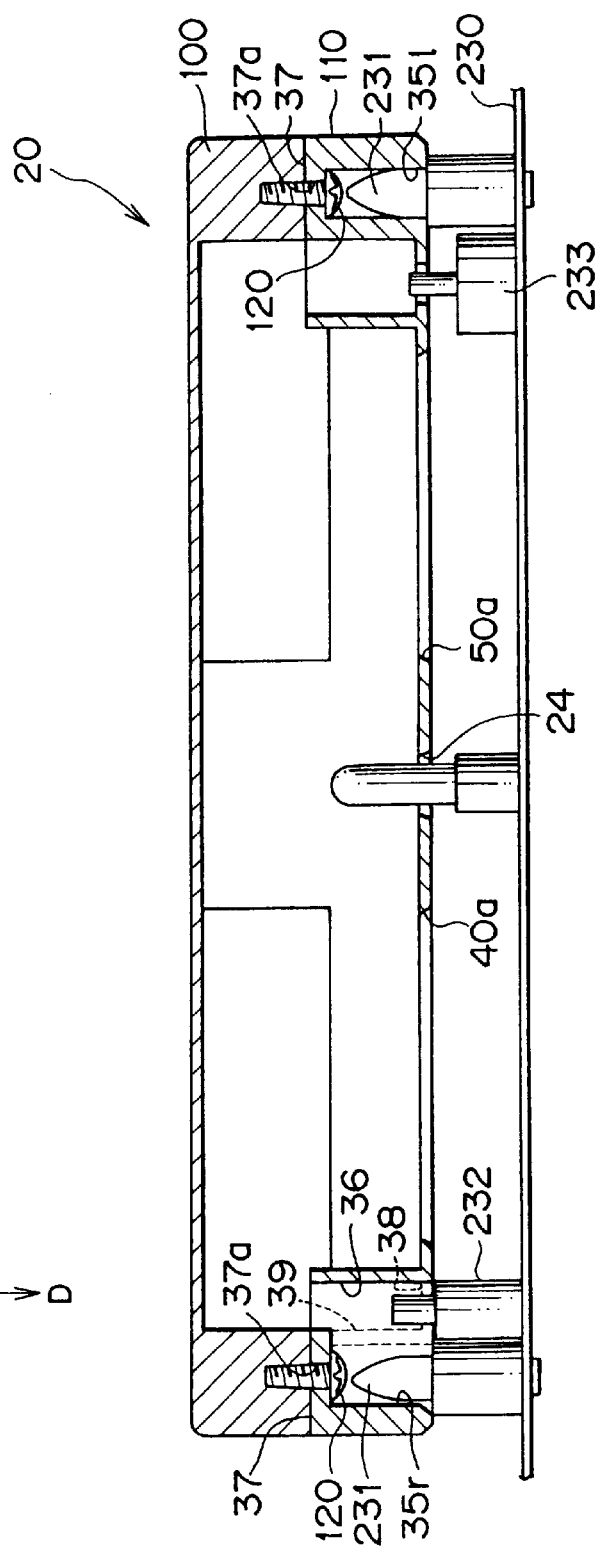
FIG. 11 is a sectional view, taken on line XI—XI of FIG. 9, of the tape cassette loaded in the tape drive apparatus, showing a state in which the ID hole is opened.

Referring to FIGS. 10 and 11, the connection piece 39, which connects the block piece 38 to the bottom plate 37, functions to prevent accidental cutout of the block piece 38. If the connection piece 39 is not provided, the block piece 38 is only connected to the peripheral edge of the long-hole with the three small pieces 38a. Such connection of the block piece 38 is weak. As a result, there may occur the following problem: namely, when a positioning pin (to be described later), which is inserted in the positioning hole 35r adjacent to the block piece 38 at the time of loading of the tape cassette 10 in a tape drive apparatus, is brought into contact with the block piece 38, the small pieces 38a may be broken, whereby the block piece 38 be cut out of the edge of the long-hole. To solve such a problem, the connection piece 39 is provided. The provision of the connection piece 39 makes it possible to prevent accidental cutout of the block piece 38, and to allow only intentional cutout of the block piece 38.

Since the positioning hole 35r is formed such that the length thereof in the lateral direction is longer than the length thereof in the minor direction, the positioning pin can be easily inserted in the positioning hole 35r irrespective of the presence or absence of the block piece 38 (see FIGS. 12 and 13). The positioning hole 35r functions not as a reference hole but as a counter positioning hole.

According to this embodiment, since the positioning hole 35r and the ID hole 36 are formed in the common long-hole, it is possible to make effective use of a space as compared with the related art structure that two holes (positioning hole and ID hole) are separately provided in the cassette shell 20, and hence to contribute to miniaturization of the tape cassette 10.

An erroneous erasing preventing detection hole 45 is provided on the right side of the left positioning hole 35l. The detection hole 45 is to be closed or opened by an erroneous erasing preventive tag (not shown) to be described later.

Referring to FIG. 8, the cassette shell 20 is assembled by butting an upper shell 100 to a lower shell 110. Each of the above-described parts is shared between the upper and lower shells 100 and 110, or formed by joining the upper and lower shells 100 and 110 to each other.

Referring to FIG. 5, the upper shell 100 integrally includes an upper surface portion 101 constituting the entire upper surface of the cassette shell 20; a rear surface portion 102 constituting the upper half of the rear surface of the cassette shell 20; right and left side surface rear portions 103 each constituting most of an approximately rear half portion, excluding a lower end portion, of each of the right and left side surfaces of the cassette shell 20; right and left side surface front portions 104r and 104l each constituting an upper end portion of the remaining portion of each of the right and left side surfaces of the cassette shell 20; and right and left front surface portions 105 each constituting a portion, excluding a lower end portion, of each of the right and left side portions (excluding a central portion) of the depth surface of the mouth portion 21. As shown in FIGS.

5, 15A, 16A and 17A, the side surface front portions 104r and 104l are retreated slightly inwardly from the side surface rear portions 103. The left side surface front portion 104l is formed at a position retreated slightly inwardly from the side edge of the upper surface portion 101, to form the above-described hood-like portion 28a.

Referring to FIG. 4, the lower shell 110 integrally includes a bottom surface portion 111 constituting the entire bottom surface of the cassette shell 20; a rear surface portion 112 constituting a lower half of the rear surface of the cassette shell 20; right and left side surface rear portions 113 each constituting an approximately rear half of each of the right and left side surfaces of the cassette shell 20; right and left side surface front portions 114 each constituting a portion, excluding an upper end portion, of the remaining portion of each of the right and left side surfaces of the cassette shell 20; a front surface central portion 115 constituting a central portion of the front surface of the cassette shell 20, that is, the depth surface of the mouth portion 21; right and left front surface side portions 116 each constituting a lower end portion of each of the right and left side portions (excluding the central portion) of the mouth portion 21; and right and left inner side surface portions 117 each constituting an inner side surface of each of the right and left tape extraction portions 22. As shown in FIGS. 10 and 11, the positioning holes 35l and 35r and the ID hole 36 are formed in the bottom surface portion 111 of the lower shell 110.

As shown in FIG. 4, a portion 113a, other than a portion corresponding to a lower end portion of the projection 29, of the side surface rear portion 113 of the lower shell 110 is positioned inwardly from the side surface rear portion 103 of the upper shell 100, to form a slight gap therebetween. A lower end portion of such a gap forms the above-described groove at the inner end portion of each of the step portions 27a and 27b.

As shown in FIG. 4, a rear end portion of the side surface front portion 114 of the lower shell 110 has, at its upper end, a cutout 114a opened upwardly. A portion, near the upper end, of the outer surface of each side surface front portion 114 has a shallow recess 114b which extends forwardly but excluding the front end portion, and an upper end portion of the recess 114b has a shallow recess 114c which extends forwardly excluding the front end portion.

An inner surface 114d of each side surface front portion 114 is taken as a taper surface which becomes thinner as nearing the front end, whereby each tape extraction portion 22 becomes wider outwardly as nearing the opening 22a. With the provision of such a taper surface 114d, as will be described in detail later, the magnetic tape 30 extracted from the tape extraction portion 22 can be widened outwardly, to enlarge an arrangement permissible region of a tape extraction guide provided in a tape drive apparatus for extracting the magnetic tape 30.

The stripe recesses 21a formed in the depth surface of the mouth portion 21 are formed in the right and left front surface portions 105 of the upper shell 100 and in the right and left front surface side portions 116 of the lower shell 110 (see FIGS. 4 and 5). The reel base insertion holes 23, the insertion hole 24, and the shading cylinder 25 are formed in the bottom surface portion 111 of the lower shell 110. As shown in FIG. 2, the right cam portion 26 is formed on a front end portion of the right side surface front portion 114 of the lower shell 110, and the left cam portion 26 is formed on a front end portion of the left side surface front portion 114 of the lower shell 110 and a front end portion of the left side surface front portion 104l of the upper shell 100.

Each of the step portion 27a and 27b is formed by a lower end of each of the right and left side surface rear portions 103 (see FIG. 17).

The sliding groove 28b is formed between each of the right and left side surface front portion 104r and 104l of the upper shell 100 and the recess 114b formed in the upper end portion of each of the right and left side surface front portions 114 of the lower shell 110 (see FIGS. 16 and 17). A slight gap is formed by a recess 114c formed between each of the right and left side surface front portions 104r and 104l of the upper shell 100 and the upper end portion of each of the right and left side surface front portions 114 of the lower shell (see FIGS. 16 and 17).

The projection 29 is formed over the upper surface portion 101 and the right and left side surface rear portions 103 of the upper shell 100 and the right and left rear portions 113 of the lower shell 110 (see FIGS. 1 and 5).

The translucent holes 25c are formed by blocking the upper ends of the cutouts 114a formed in the right and left side surface front portions 114 of the lower shell 110 with the upper shell 100 (see FIGS. 18 and 19).

The cassette shell 20 is formed by butting the upper shell 100 to the lower shell 110 and joining them to each other with screws 120 (see FIG. 8). In addition, as described above, two of the screws 120, positioned at the right and left corners of the rear portion of the lower shell 110, are inserted in the small holes 37a formed in the bottom plates 37 of the positioning holes 35r and 35l and tightened to the upper shell 100 (see FIGS. 10 and 11).

Figure 6:
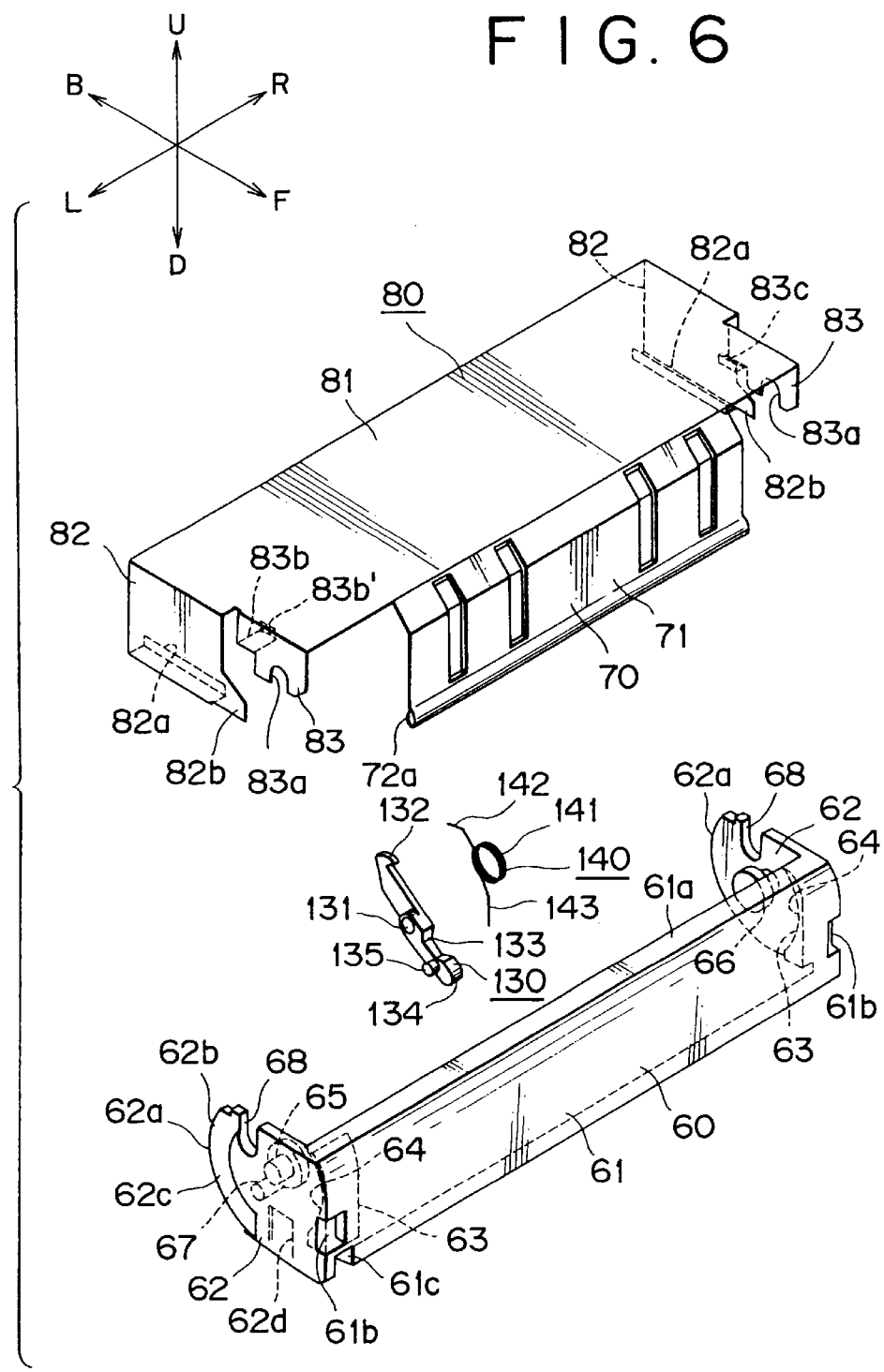
FIG. 6 is an exploded perspective view of a slider unit of the tape cassette.

Referring to FIG. 6, the slider 80 is formed of a thin metal plate, preferably, a thin metal plate having an electrical conductivity. The slider 80 integrally includes an upper surface portion 81 formed of a plate extending longer in the lateral direction and side surface portions projecting downwardly from right and left side edges of the upper surface portion 81. Each side surface portion includes a principal surface portion 82 extending from a portion offset slightly forwardly from the center in the longitudinal direction to the rear end, and a lid supporting portion 83 positioned in front of the principal surface portion 82.

Referring to FIGS. 6 and 16, the lid supporting portion 83 is positioned slightly inwardly from the principal surface portion 82, and has a vertical width being nearly a half that of the principal surface portion 82. The right and left lid supporting portions 83 have semi-circular shaft holding portions 83a opened downwardly, and also have, at the lower edges of rear end portions, sliding projections 83c and 83b projecting inwardly, respectively. The left sliding projection 83b is longer than the right sliding projection 83c. The sliding projections 83c and 83b have leading ends 83c' and 83b' bent upwardly, respectively.

Referring to FIGS. 6 and 17, a lower end portion of each of the principal surface portions 82 is folded inwardly, to form a sliding engagement portion 82a having a U-shaped cross-section. An overlap portion 82b is provided on a lower end of the front edge of each of the principal surface portions 82 in such a manner as to project forwardly, slightly downwardly therefrom.

Referring to FIG. 6, a back lid 70 is integrally formed on the slider 80 in such a manner that the upper edge of the back lid 70 is integrated with the front edge of the upper surface portion 81 of the slider 80. The back lid 70 integrally includes a main portion 71 extending in the vertical direction and having a lateral width equal to the lateral width of the mouth portion 21, and a lower end closing portion 72 extending forwardly, slightly downwardly from the lower edge of the main portion 71. The lower end closing portion 72 is folded to the back side, that is, to the rear side, to form a folded portion 72a. The formation of the folded portion 72a is advantageous in that since any sharp edge is not formed at the lower end of the lower end closing portion 72, it is possible to prevent the magnetic tape 30, or a member on the tape drive apparatus side, for example, a pinch roller from being damaged by the back lid 70.

Figure 7:
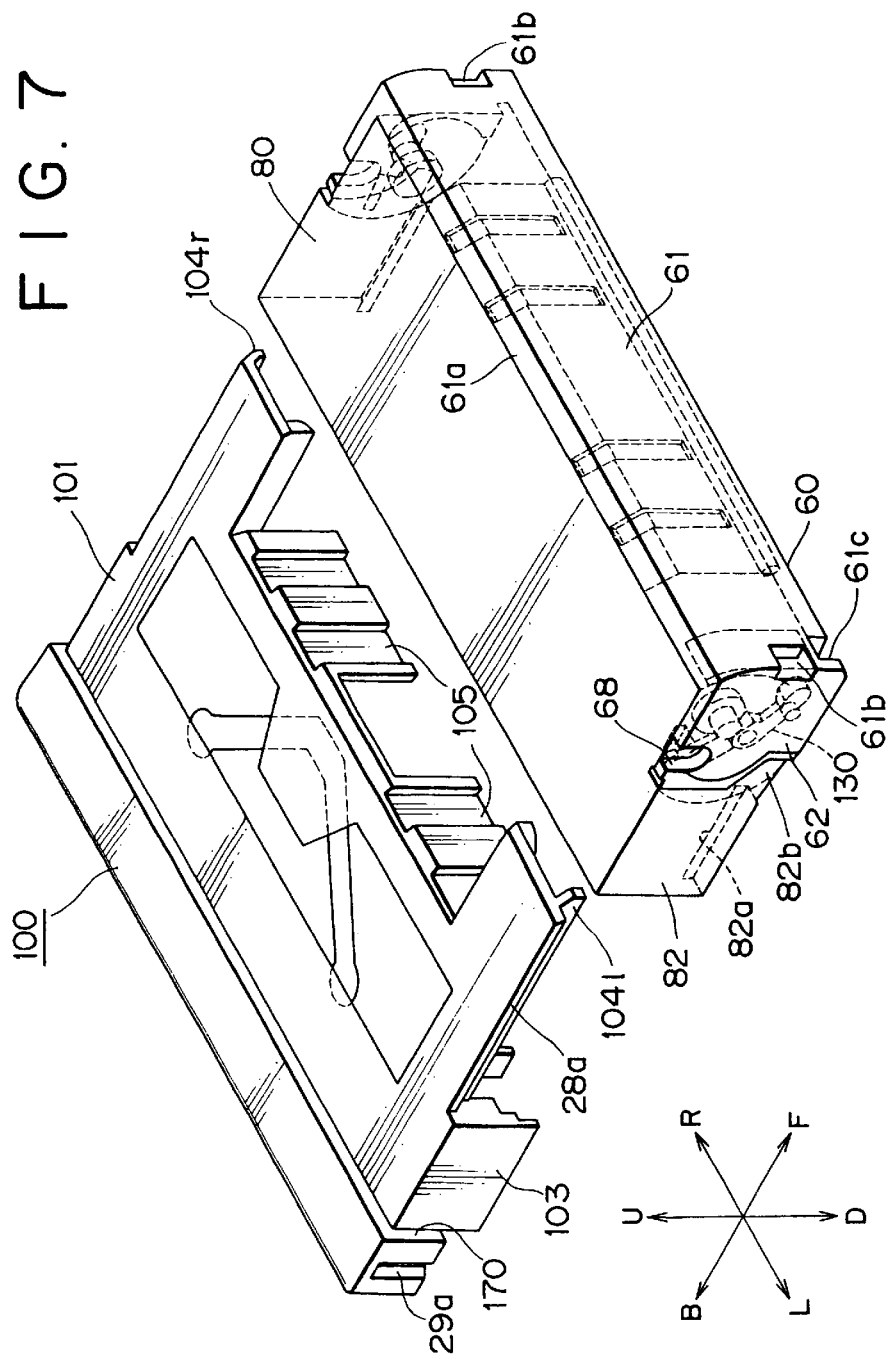
FIG. 7 is a perspective view of the upper shell unit and the slider unit, which are in a state before being assembled to each other.

The slider 80 is mounted on the cassette shell 20 in such a manner as to be slidable in the longitudinal direction, as follows (see FIG. 7):

When the slider 80 is slid rearwardly in a state in which the upper surface portion 81 of the slider 80 is mounted on the front end portion of the upper surface portion 101 of the upper shell 100 (see FIG. 7), the sliding engagement portions 82a of the slider 80 are slidably engaged with the lower edges of the side surface rear portions 103 of the upper shell 100 (see FIGS. 15 and 16), and further, the sliding projections 83c and 83b of the slider 80 are positioned on the back sides of the side surface front portions 104r and 104l of the upper shell 100 and the upwardly bent leading ends 83c' and 83b' of the slider 80 are engaged with the inner surfaces of the side surface front portions 104r and 104l of the upper shell 100 (see FIG. 16).

When the upper shell 100 is joined to the lower shell 110, the sliding grooves 28b longer in the longitudinal direction are formed between the side surface front portions 104r and 104l of the upper shell 100 and the recesses 114b of the lower shell 110, and the sliding projections 83c and 83b of the slider 80 are slidably located at upper end portions of the sliding grooves 28b, that is, at the lower end portions of the recesses 114c and the upwardly bent leading ends 83c' and 83b' of the sliding projections 83c and 83b are located in the gaps formed between the side surface front portions 104r and 104l of the upper shell 100 and the recesses 114c of the lower shell 110, respectively (see FIG. 16). In this way, the slider 80 is mounted in the cassette shell 20 in such a manner as to be slidable in the longitudinal direction. The rear limit of the movement range of the slider 80 is determined by the contact of the rear end of the upper surface portion 81 of the slider 80 with the projection 29 of the cassette shell 20 (see FIG. 25), and the front limit of the movement range of the slider 80 is determined by the contact of a turning fulcrum shaft (to be described in detail later) of the front lid 60 supported by the slider 80 with the front ends of the sliding grooves 28b (see FIG. 20).

The front lid 60 is turnably supported by the lid supporting portions 83 provided at the front end portion of the slider 80 (see FIG. 6).

Referring to FIG. 6, the front lid 60 integrally includes a front surface portion 61 formed into a stripe shape extending substantially in the lateral direction, and right and left side surface portions 62 projecting rearwardly from right and left edges of the front surface portion 61. The front surface portion 61 has an upper end portion 61a gently curved in such a manner as to extend upwardly, rearwardly.

Figure 15B:
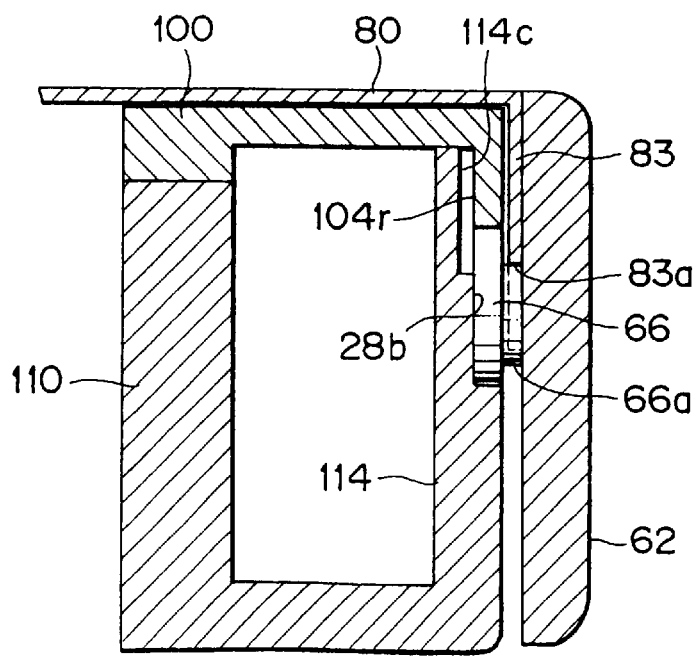

A thick wall portion 63 is formed at a portion being in contact with a joint between the inner surface of each of the side surface portions 62 and the front surface portion 61. A restricting surface 64, formed into a circular-arc shape in a side view, is provided on the thick wall portion 63. Right and left turning fulcrum shafts 66 and 65 project from approximately central portions, facing to the restricting surfaces 64, of the inner surfaces of the right and left side surface portions 62. Annular grooves 66a and 65a are formed in base portions of the turning fulcrum shafts 66 and 65, respectively (see FIG. 15). A large-diameter portion 65b and a small-diameter portion 65c are provided adjacently to the annular groove 65a in this order on the left turning fulcrum shaft 65, and the overall length of the left fulcrum shaft 65 is longer than that of the right fulcrum shaft 66 (FIG. 15). The restricting surface 64 is formed into a circular-arc shape around each of the turning fulcrum shafts 66 and 65 (see FIG. 14).

Referring to FIG. 6, a rear end portion 62a of each of the right and left side surface portions 62 is formed into a circular-arc shape around each of the turning fulcrum shafts 66 and 65. A circular-arc shaped portion 62c, corresponding to the circular-arc shaped rear end portion 62a, of the outer surface of each of the right and left side surface portions 62 is made thin, to form a circular-arc shaped shallow thin wall portion 62b. The portion 62c, that is, the thin wall portion 62b is taken as an overlap portion.

A downwardly opening recess 62d is formed in a lower end portion of the inner side of the left side surface portion 62 (see FIG. 6).

A supporting shaft 67 is provided on the inner surface of the left side surface portion 62 at a position spaced rearwardly and downwardly from the turning fulcrum shaft 65 in such a manner as to project therefrom (see FIG. 6).

A translucent cutout 68 is formed in a portion, near the rear end, of the upper edge of each of the right and left side surface portions 62 (see FIG. 6).

An engagement recess 61b opened forwardly and sideways is formed in each of both side edge portions of the front surface portion 61 at a position near the lower end, and a through-cutout 61c is formed in a lower edge portion of the front surface portion 61 at a position near the left end (see FIG. 6).

The annular grooves 66a and 65a of the turning fulcrum shafts 66 and 65 of the front lid 60 are rotatably engaged in the shaft holding portions 83a of the slider 80, whereby the front lid 60 is turnably supported by the lid supporting portions 83 provided at the front end portion of the slider 80 (see FIG. 14). At this time, the overlap portions 82b formed on the principal surface portions 82 of the slider 80 are slidably positioned in the thin wall portions 62b of the side surface portions of the front lid 60 (see FIG. 14), whereby the outer surfaces of the principal surface portions 82 of the slider 80 and the outer surfaces of the side surface portions 62 of the front lid 60 are positioned in the same planes, that is, at the same levels (see FIG. 16).

A lid lock member 130 is mounted on the inner side of the left side surface portion 62 of the front lid 60 (see FIG. 6). The lid lock member 130 is formed into a slender shape as a whole and has at its central portion a supporting hole 131 (see FIG. 20). The supporting shaft 67 formed on the left side surface portion 62 of the front lid 60 is inserted in the supporting hole 131 of the lid lock member 130, whereby the lid lock member 130 is turnably supported on the left side surface portion 62.

Figure 20:
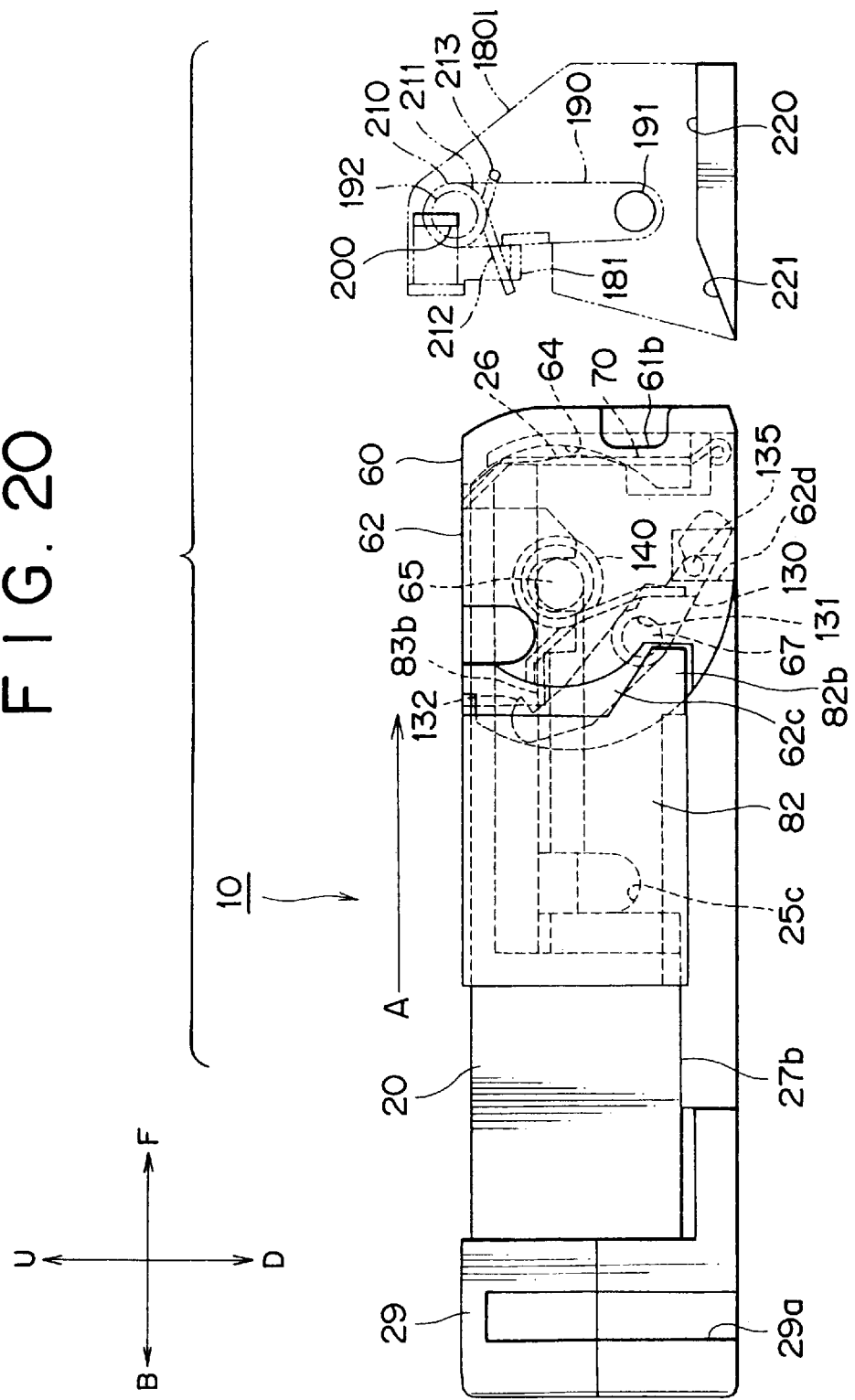
FIG. 20 is a schematic side view of the tape cassette, showing a state immediately before the tape cassette is inserted in a cassette holder.

A locking claw 132 is formed on an upper end portion of the lid lock member 130. When the lid lock member 130 is tilted rightwardly, downwardly as seen from the left side, the locking claw 132 projects nearly forwardly. As shown in FIG. 20, the locking claw 132 locks, from the rear side, the upper surface of the sliding projection 83b formed on the left lid supporting portion 83 of the slider 80. The lid lock member 130 has a spring catch surface 133 at a position between the supporting hole 131 and the lower end (see FIG. 6). To be more specific, the spring catch surface 133 is formed by cutting out a portion on the side facing to the left side surface portion 62. A front portion 134 of the lower end surface of the lid lock member 130 is formed into a circular-arc shape. The lid lock member 130 also has a lock pin 135 projecting from a portion, near the lower end, of the left side surface facing to the left side surface portion 62 of the front lid 60. The lock pin 135 is positioned in the recess 62d formed in the left side surface portion 62 of the front lid 60 (see FIG. 20).

A torsion-coil spring 140 is provided for biasing each of the front lid 60 and the lid lock member 130 in a specific direction.

A coil portion 141 of the torsion-coil spring 140 is mounted around the large-diameter portion 65b of the turning fulcrum shaft 65 formed on the left side surface portion 62 of the front lid 60 (see FIG. 15A). One arm piece 142 is brought, from the front side, into elastic-contact with the upper surface of the sliding projection 83b formed on the left lid supporting portion 83 of the slider 80 and the other arm piece 143 is brought into elastic-contact with the spring catch surface 133 of the lid lock member 130 (see FIG. 20). With this configuration, the lid lock member 130 is biased clockwise as seen from the left side, and the front lid 60 is biased, via the lid lock member 130 and the supporting shaft 67, clockwise as seem from the left side, that is, in the direction in which the front side of the mouth portion 21 is closed with the front surface portion 61 of the front lid 60.

The lid lock member 130 and the torsion-coil spring 140, which are positioned inside the left side surface portion 62 of the front lid 60 as described above, are not exposed to the outside even when the front lid 60 is turned to be opened. Accordingly, the lid lock member 130 and the torsion-coil spring 140 cannot be touched with fingers or removed unless the slider 80 is removed from the cassette shell 20. In addition, since the lid lock member 130 not only locks the front lid 60 in the closed state but also presses both the front lid 60 and the slider 80 with an elastic force of the torsion-coil spring 140, it is possible to eliminate the looseness between the front lid 60 and the slider 80.

Referring to FIG. 4, a memory containing groove 118 is formed in a right side rear end portion of the lower shell 110, and an in-cassette memory 150 is contained in the memory containing groove 118. The in-cassette memory 150 includes a horizontally elongated rectangular board 151, a memory device 152 mounted on a central portion of the board 151, and communication antennas 153 formed on front and back surfaces of the board 151. The communication antenna 153 is formed into a spiral conductive pattern. The in-cassette memory 150 communicates with external equipment via the antennas 153, and records data, such as the kinds of magnetic tapes and recording contents, other than various kinds of information provided by the ID hole 36.

Referring to FIG. 5, one-end portions of two reel pressing springs 160 are fixed to the back side of the upper surface portion 101 of the upper shell 100. The central portions of the upper surfaces of the tape reels 40 and 50 are pressed down to the bottom surface portion 111 of the lower shell 110 by the other end portions of the reel pressing springs 160.

The tape cassette 10 configured as described above is assembled in accordance with a procedure of forming a lower shell unit by sub-assembling respective members in the lower shell 110, forming an upper shell unit by sub-assembling respective members in the upper shell 100, and forming a slider unit by previously sub-assembling the lid lock member 130 and the like in the front lid 60 and supporting the front lid 60 on the slider 80; and assembling the slider unit in the upper shell unit, and joining the upper shell unit, in which the slider unit has been assembled, to the lower shell unit (see FIGS. 4 to 8).

To be more specific, the lower shell unit is formed by sub-assembling the tape reels 40 and 50 around which the magnetic tape 30 is wound, the reel lock members 90, the in-cassette memory 150, and the like in the lower shell 110 (see FIGS. 4 and 8). The upper shell unit is formed by sub-assembling the reel pressing springs 160 in the upper shell 100 (see FIG. 5). The slider unit is formed by previously sub-assembling the lid lock member 130 and the torsion-coil spring 140 in the front lid 60, and supporting the front lid 60 on the slider 80 (see FIG. 6).

Figure 26A:
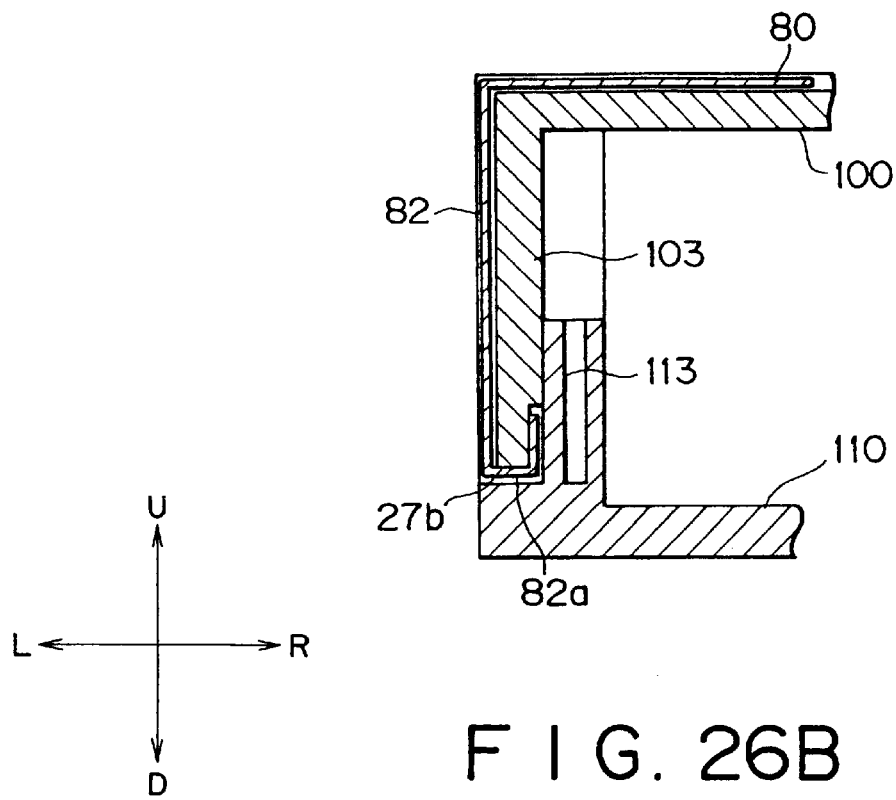
Figure 26B:
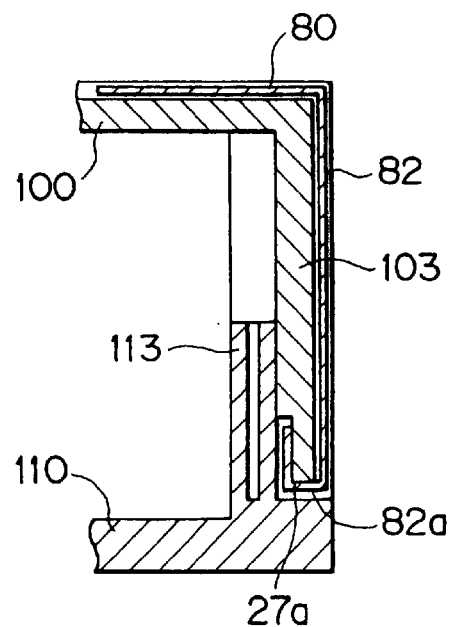

The slider unit is assembled in the upper shell unit in a state in which the front lid 60 is turned upwardly. That is to say, the upper surface portion 81 of the slider 80 is placed on the front end portion of the upper surface portion 101 of the upper shell 100, and in such a state, the slider 80 is slid rearwardly, so that the sliding engagement portions 82a of the slider 80 are slidably engaged on the lower edges of the side surface portions 103 of the upper shell 100 (see FIG. 26). At the same time, the sliding projections 83c and 83b of the slider 80 are positioned on the back sides of the side surface front portions 104r and 104l of the upper shell 100 and the upwardly bent leading ends 83c' and 83b' of the sliding projections 83c and 83b are engaged on the inner surfaces of the side surface front portions 104r and 104l (see FIGS. 7 and 8). The state that the slider unit, in which the front lid 60 has been sub-assembled on the slider 80, is assembled in the upper shell unit is shown in FIG. 8.

The upper shell unit, in which the slider unit has been assembled, is joined to the lower shell unit. To be more specific, the lower ends of respective portions of the upper shell 100 in the upper shell unit are butted to the upper ends of respective portions of the lower shell 110 in the lower shell unit, and in such a state, the slider 80 is slid to the front end and the front lid 60 is turned downwardly. Accordingly, the small-diameter portion 65c of the left turning fulcrum shaft 65 of the front lid 60 is slidably engaged in the sliding groove 28b formed in the left side surface of the cassette shell 20, and the right turning fulcrum shaft 66 is slidably engaged in the sliding groove 28b formed in the right side surface of the cassette shell 20 (see FIG. 15). As a result, the turning fulcrum shafts 66 and 65 of the front lid 60 can be moved back and forth with their vertical movement limited by the sliding grooves 28b.

The upper shell 100 is then joined to the lower shell 110 with the screws 120 (see FIG. 8), to complete the tape cassette 10 (see FIG. 1).

Since all of the components of the tape cassette 10 are sub-assembled into the lower shell unit, upper shell unit, and slider unit and the three units are assembled in accordance with the above-described sequence, it is possible to facilitate the parts control in the assembling step and to simplify the assembly.

In the non-loading state of the tape cassette 10, the front side of the magnetic tape 30 is covered with the front lid 60, the back side thereof is covered with the back lid 70, the lower side thereof is covered with the lower end closing portion 72 of the back lid 70, and the upper side thereof is covered with the upper end portion 61a of the principal surface portion 61 of the front lid 60 (see FIG. 1). Accordingly, it is possible to prevent the adhesion of dust on the magnetic tape 30 and also prevent contact of foreign matters and fingers with the magnetic tape 30. Since the front end surfaces 22b, 22c and 22d and the like of the tape extraction portions 22 are covered with the front surface portion 61 of the front lid 60, they can exhibit a good external appearance (see FIG. 1). The locking claw 132 of the lid lock member 130 locks, from the rear side, the upper surface of the sliding projection 83b of the slider 80, whereby the front lid 60 is locked at the closed position shown in FIG. 1.

While not shown, an erroneous erasing preventive tag is provided on the back surface of the cassette shell 20. When the erroneous erasing preventive tag is moved in the height direction of the cassette shell 20, there emerges a possible recording state or an impossible recording state. In this case, when located at a lower position, the erroneous erasing preventive tag closes the erroneous erasing preventing detection hole 45, and when located at an upper position, the erroneous erasing preventive tag opens the erroneous erasing preventing detection hole 45. The opening/closing of the detection hole 45 is detected by an erroneous erasing preventing detecting switch (to be described later), whereby it is decided whether the operational state is the possible recording state or the impossible recording state.

Since the lid supporting portions 83 of the slider 80 are retreated inwardly from the principal surface portions 82 (see FIG. 6), the outer surfaces of the side surface portions 62 of the front lid 60 supported by the lid supporting portions 83 are nearly at the same levels as those of the outer surfaces of the principal surface portions 82 of the slider 80 (see FIG. 2). As a result, only a slight step 170 is formed between the projecting portion 29 and an approximately rear half of each side surface of the cassette shell 20 (that is, a surface, excluding the rear end portion, of each of the side surface rear portions 103 of the upper shell 100), which is in contact with each of the principal surfaces 82 of the slider 80 (see FIGS. 1 and 2). The step 170 is equivalent to the thickness of each of the principal surface portions 82 of the slider 80.

The loading/unloading of the tape cassette 10 in or from a tape drive apparatus will be described below.

Figure 21:
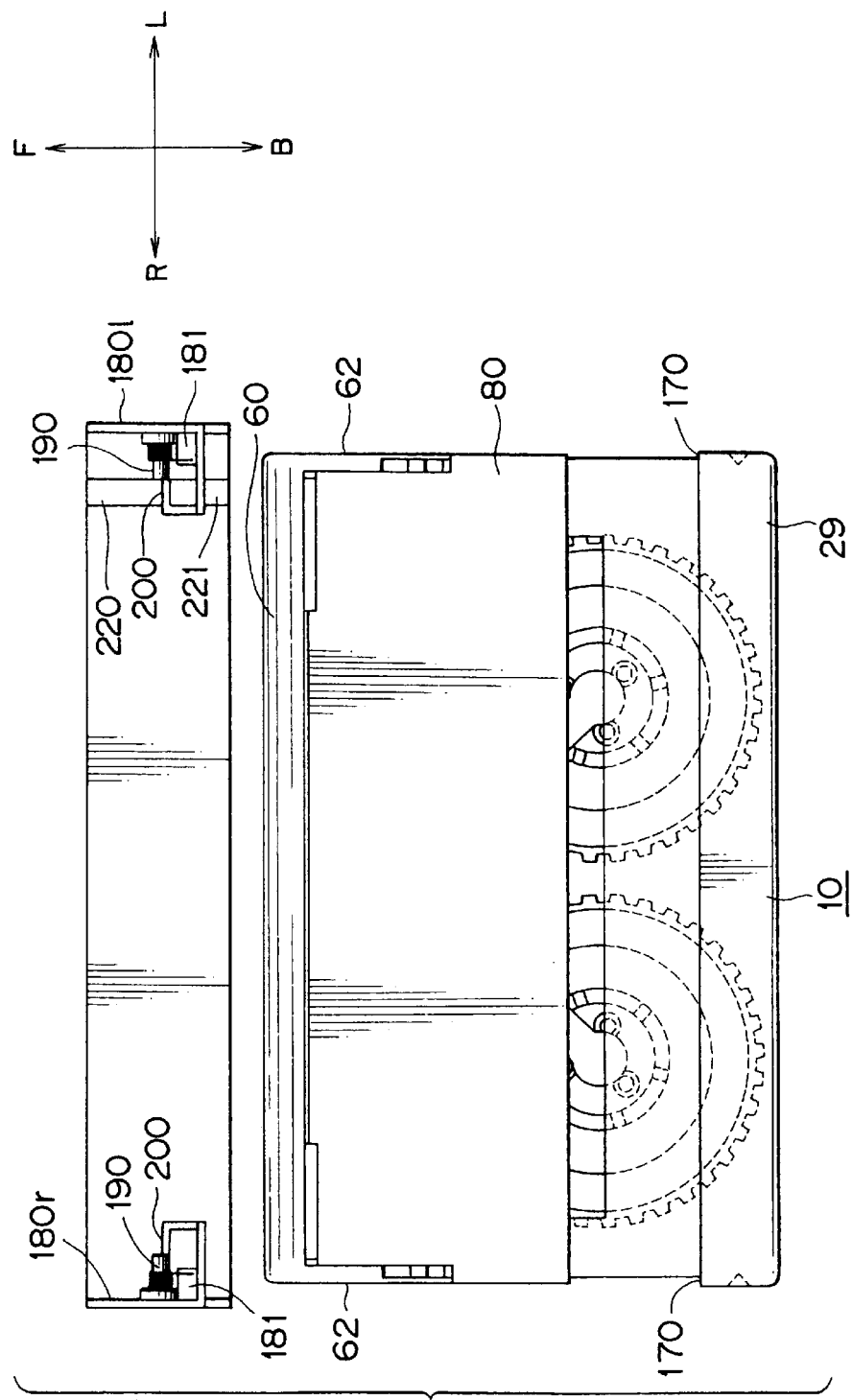
FIG. 21 is a schematic plan view of the tape cassette, showing the state immediately before the tape cassette is inserted in the cassette holder.

Referring to FIGS. 20 and 21, a cassette holder (not shown) for holding the tape cassette 10 and loading the tape cassette 10 at a specific position of the tape drive apparatus has, at positions corresponding to those of both the ends of the tape cassette 10, plate-like supporting members 180r and 180l. Lid openers 190 and lid pressing projections 200 are provided on the supporting members 180r and 180l.

Referring to FIG. 20, an upper end portion of the lid opener 190 formed into a long-arm shape is turnably supported on an upper end portion of the inner surface of each of the supporting members 180r and 180l. An engagement projection 191 projects from the inner surface of a turning end portion of the lid opener 190. A coil portion 211 of a torsion-coil spring 210 is wound around a turning shaft 192 of the lid opener 190. One arm 212 is brought, from the upper side, into elastic-contact with a spring catch piece 181 which is formed by cutting part of each of the supporting members 180r and 180l and raising it inwardly, and the other arm 213 is brought into elastic-contact with a portion, near the turning fulcrum, of the front edge of the lid opener 190. With this configuration, the lid opener 190 is biased clockwise as seen from the left side. Further, the lid opener 190 is held in an upright posture with its turning end located at the lowermost position, by the contact of the portion, near the upper end, of the lid opener 190 with the spring catch piece 181.

The lid pressing projection 200 is formed on the upper end portion of each of the supporting members 180r and 180l in such a manner as to project inwardly therefrom (see FIG. 21).

The left supporting member 180l has a lock releasing cam 220 positioned at a portion, near the right side surface, of a base end of the left supporting member 180l (see FIG. 21). An end surface, on the tape cassette insertion side, of the lock releasing cam 220 is taken as a tilt portion 221 (see FIG. 20). The lateral width of the lock releasing cam 220 is slightly smaller than the width of the through-cutout 61c formed in the front surface portion 61 of the front lid 60 (see FIG. 21).

When the tape cassette 10 is inserted in the cassette holder in the direction A shown in FIG. 20, with its front side, that is, its front lid side directed forwardly, the front end portion of the tape cassette 10 enters between the supporting members 180r and 180l (see FIG. 21), and the lock releasing cam 220 is inserted in the front lid 60 through the though-cutout 61c formed in the front surface portion 61 of the front lid 60. At this time, since the steps 170 formed on the rear end portion of the cassette shell 20 are very small, they are not caught by an entrance or the like of the cassette holder (see FIG. 21).

Figure 22:
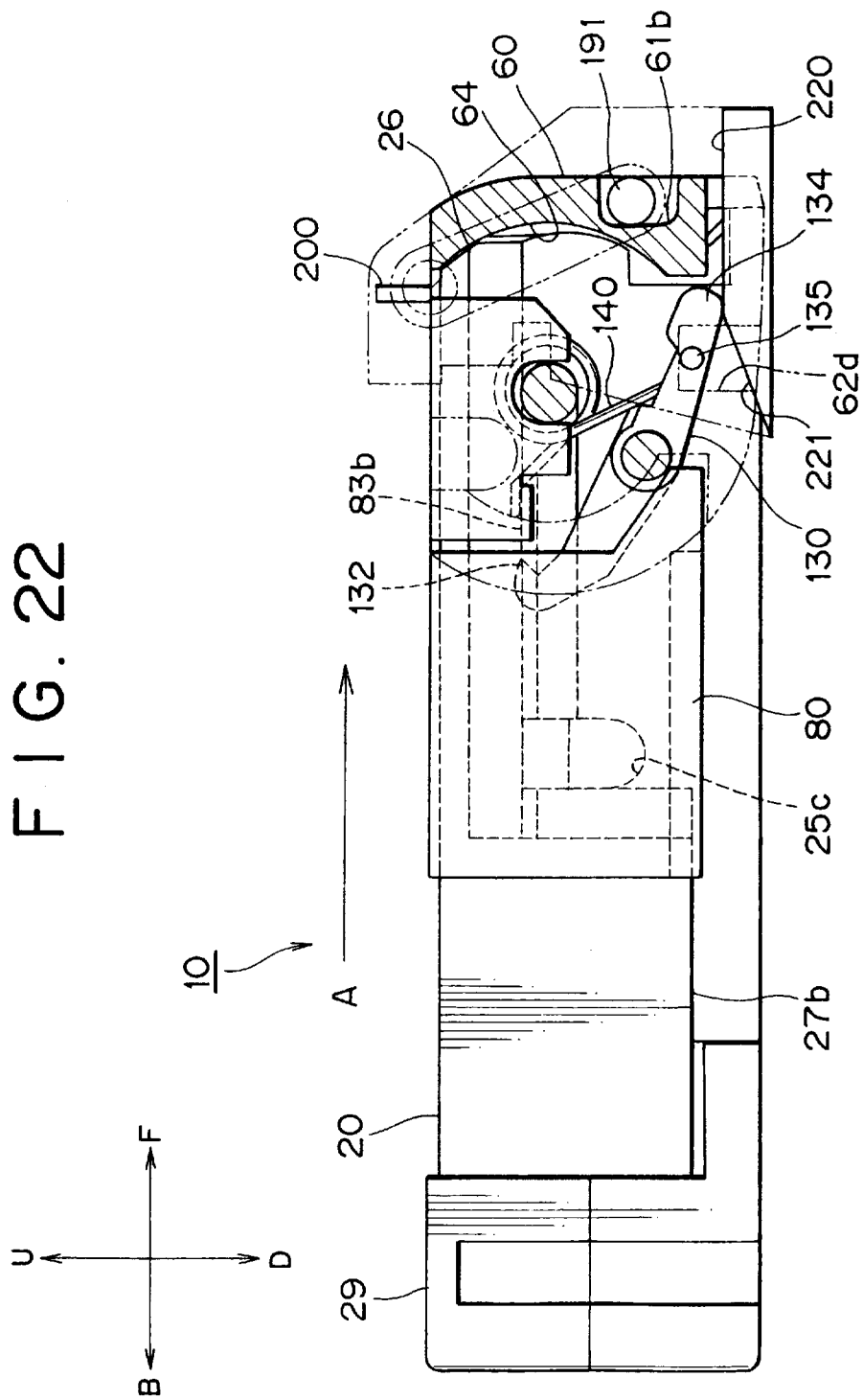
FIG. 22 is a schematic side view of the tape cassette, with an essential portion cutaway, showing a state in which locking by a lid lock member is released.

The engagement projections 191 of the lid openers 190 are engaged in the engagement recesses 61b of front lid 60. At the same time, the circular-arc surface portion 134 at the lower end of the lid lock member 130 is slid upwardly on the tilt portion 221 of the lock releasing cam 220, whereby the lid lock member 130 is turned counterclockwise in FIG. 22, to release the engagement of the locking claw 132 with the sliding projection 83b of the slider 80, with a result that the locking of the front lid 60 to the closed position is released (see FIG. 22). At this time, the lock pin 135 of the lid lock member 130 is moved in the recess 62d formed in the inner surface of the left side surface portion 62 of the front lid 60.

Figure 23:
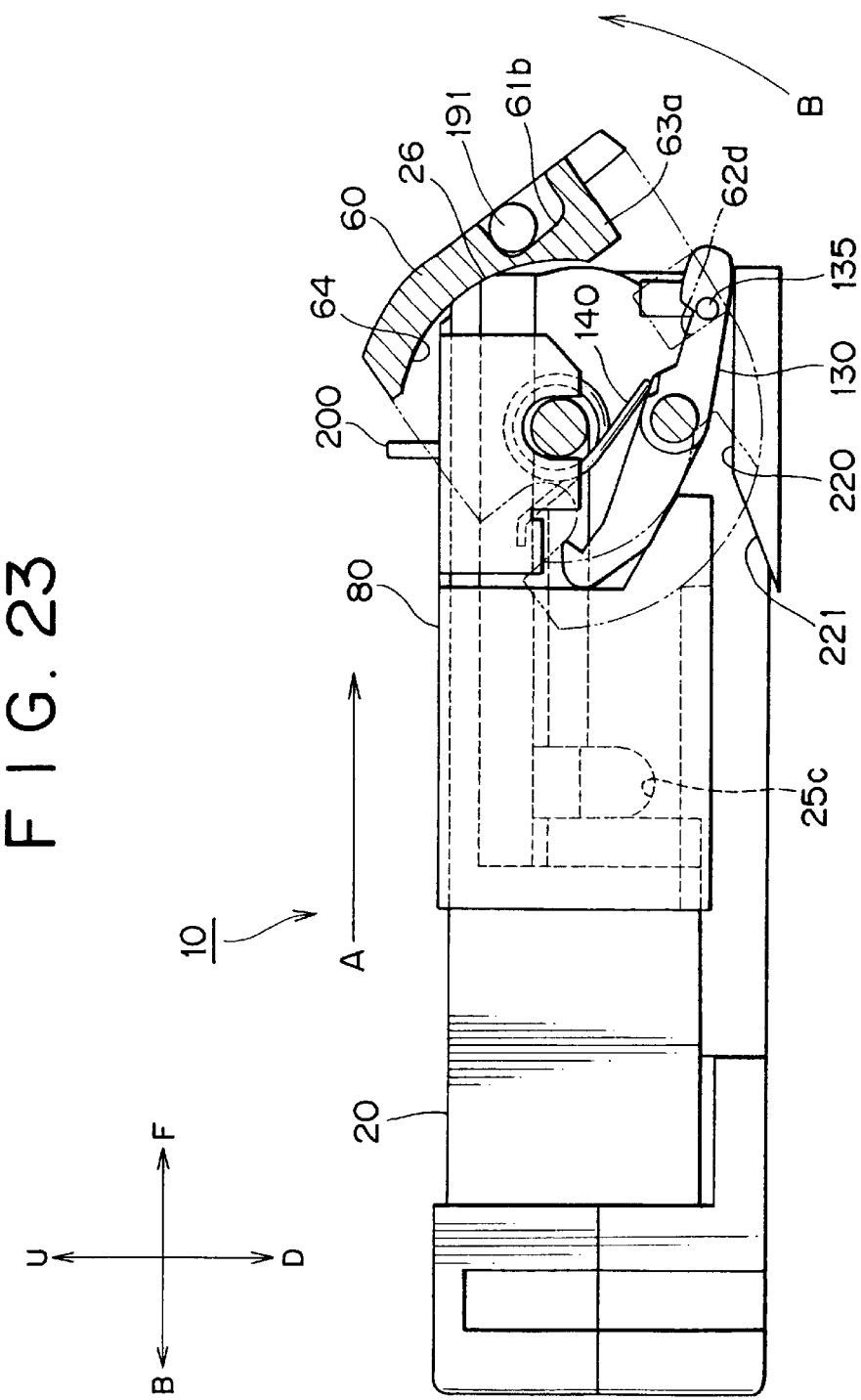
FIG. 23 is a schematic side view of the tape cassette, with an essential portion cutaway, showing a state subsequent to the state shown in FIG. 22.

When the tape cassette 10 is further inserted in the cassette holder in the direction A, the engagement projections 191 provided at the turning ends of the lid openers 190 are pushed in the direction A, so that the lid openers 190 are turned counterclockwise in FIG. 23, that is, in the direction B. Accordingly, the engagement projections 191 are further moved upwardly in the direction B, with a result that the front lid 60 having the engagement recesses 61b engaged with the engagement projections 191 is turned counterclockwise, that is, in the direction B (see FIG. 23). In such a state, the lock pin 135 of the lid lock member 130 is caught by an edge portion of the recess 62d of the left side surface portion 62 of the front lid 60 (see FIG. 23).

A force acting to move the slider 80 rearwardly relative to the cassette shell 20 is applied to the slider 80 via the front lid 60 by the engagement projections 191 of the lid openers 190; however, since the restricting surfaces 64 of the front lid 60 are in contact with the cam portions 26 of the cassette shell 20, the slider 80 cannot be moved rearwardly relative to the cassette shell 20 and thereby only the front lid 60 is turned upwardly (see FIG. 23).

In the state shown in FIG. 23, the lock pin 135 of the lid lock member 130 is in contact with the inner edge of the rear side of the recess 62d formed in the left side surface portion 62 of the front lid 60, and as the front lid 60 is further turned in the direction B from this state, the lock pin 135 is pulled in the direction B by the inner edge of the rear side of the recess 62d, and consequently the lid lock member 130 is also turned in the direction B. In this case, since the lid lock member 130 is biased in the direction opposed to the direction B by the torsion-coil spring 140, the lock pin 135 is held in elastic-contact with the inner edge of the rear side of the recess 62d (see FIGS. 23, 24 and 25).

When the front lid 60 is turned at 90° in the direction B from the initial state (closed state shown in FIG. 20), the engagement between the restricting surfaces 64 of the front lid 60 and the cam portions 26 of the cassette shell 20 is released (see FIG. 24), so that the slider 80 becomes movable rearwardly relative to the cassette shell 20. In the state shown in FIG. 24, the lid pressing projections 200 formed on the supporting members 180r and 180l are closer, from the rear side, to the upper end of the front surface portion 61 of the front lid 60. In addition, since the overlap portions 82b of the slider 80 are positioned outside the overlap portions 62c of the side surface portions 62 of the front lid 60, the outsides of the overlap portions 62c, which are the rear end portions of the side surface portions 62, are supported by the overlap portions 82b of the slider 80 during turning of the front lid 60. As a result, the front lid 60 can be stably, smoothly turned.

Figure 24:
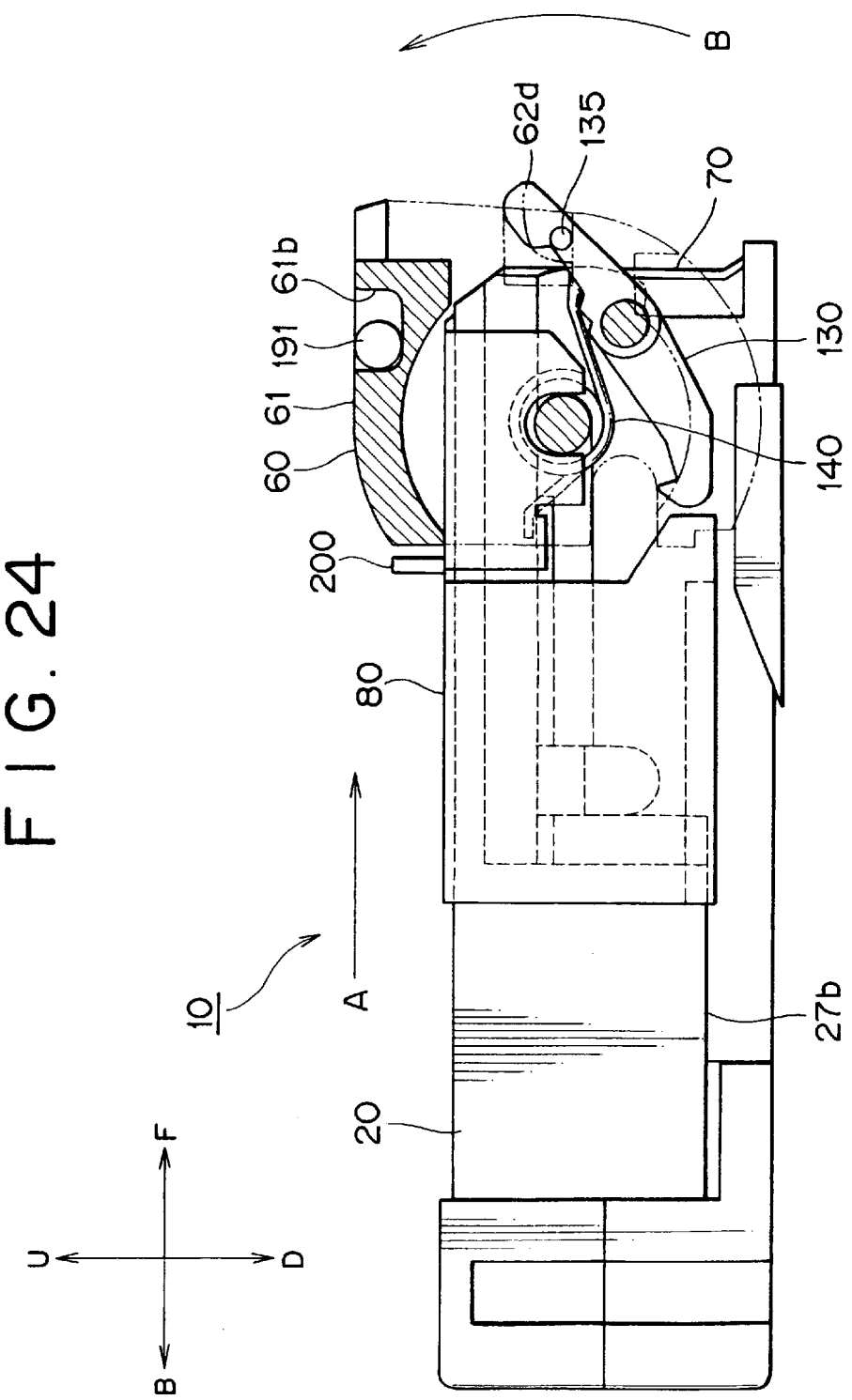
FIG. 24 is a schematic side view of the tape cassette, with an essential portion cutaway, showing a state in which the front lid reaches the opened position.

When the tape cassette 10 is further moved from the state shown in FIG. 24 to the depth side of the cassette holder, that is, in the direction A, since the engagement projections 191 of the lid openers 190 are engaged in the engagement recesses 61b of the front lid 60, the front lid 60 and the slider 80 supported by the front lid 60 cannot be moved in the direction A and are thereby left as they are. As a result, the slider 80 is moved, together with the font lid 60, rearwardly relative to the cassette shell 20 (see FIGS. 24 and 25). At this time, the back lid 70 is of course moved rearwardly relative to the cassette shell 20.

The back lid 70 is linearly moved rearwardly to be separated from the magnetic tape 30 (see FIG. 25), and accordingly, as compared with the related prior art back lid, configured to be moved rearwardly, obliquely upwardly by making use of a cam to be thus separated from the magnetic tape. The back lid 70 is advantageous in that the magnetic tape 30 is less entangled in the back lid 70 and thereby the magnetic tape 30 is prevented from being damaged due to the entanglement thereof in the back lid 70. Since the back lid 70 formed of a conductive metal plate is integrally formed on the slider 80, the back lid 70 is less electrified. Accordingly, there is no possibility that the back lid 70 attracts the magnetic tape 30 with static electricity. As a result, it is possible to prevent occurrence of an accident in which the magnetic tape 30 runs over a guide or the like at the time of loading the magnetic tape 30 at a specific loading position.

The insertion of the tape cassette 10 in the cassette holder is ended when the front end surfaces 22b, 22c, and 22d, functioning as the forward movement stoppers, of the tape extraction portions 22 are brought into contact with a stopper (not shown) provided on the cassette holder (see FIG. 25).

In the state in which the tape cassette 10 is located at the final insertion position, the back lid 70 is retreated to the deepest portion of the mouth portion 21, and the translucent cutouts 68 formed in the side surface portions 62 of the front lid 60 are aligned to the translucent holes 25c formed in the side surfaces of the cassette shell 20. In the non-loading state of the tape cassette 10, the translucent holes 25c of the cassette shell 20 are closed with the principal surface portions 82 of the slider 80 in order to prevent the permeation of foreign matters such as dust in the cassette shell 20 through the translucent holes 25c (see FIG. 25).

It is required to press down the tape cassette 10 for preventing the tape cassette 10 from being floated upwardly from the cassette holder. In this case, it may be desirable to press down the tape cassette 10 via the slider 80 made from a metal. Further, it may be desirable to bring a slider pressing member, which is made from a conductive material, into contact with a ground member of the cassette holder in order to prevent electrification of the back lid 70.

Since the front lid 60 is brought into elastic-contact with the upper surface of the cassette shell 20, the elastic force of the torsion-coil spring 140 does not act to float the cassette shell 20 upwardly from the cassette holder. According to the related prior art configuration, since the opening state of the front lid is held by a lid opening member provided on the tape drive apparatus side, an elastic force of a spring for biasing the front lid in the lid closing direction is applied to the lid opening member, and a reaction force against the biasing force acts to float the cassette shell upwardly from the cassette holder. Contrary to the prior art, in the tape cassette 10 the elastic force of the torsion-coil spring 140 only acts to bring the front lid 60 into elastic-contact with the upper surface of the cassette shell 20 (see FIG. 25).

Further, since the lock pin 135 of the lid lock member 130 is brought into elastic-contact with the inner edge of the rear side of the recess 62d of the left side surface portion 62 of the front lid 60, the elastic force of the torsion-coil spring 140 does not act to float the cassette shell 20 upwardly from the cassette holder via the lid lock member 130. To be more specific, although the lid lock member 130 is biased in the locking direction by the elastic force of the torsion-coil spring 140, when the lid lock member 130 goes in the unlock state, the lock pin 135 of the lid lock member 130 is brought into elastic-contact with and is held by the recess 62d of the front lid 60 being in elastic-contact with the upper surface of the cassette shell 20 (see FIG. 25).

As described above, in this embodiment, the front lid 60 and the back lid 70 can be sequentially moved to respective lid opening positions by using a simple structure, that is, the lid openers 190 functioning as turning arms. To be more specific, since the cam portions 26 of the cassette shell 20 are engaged with the restricting surfaces 64 of the front lid 60, the front lid 60 is first turned to the opening position, and then the back lid 70 is moved to the opening position by retreating the slider 80 (see FIGS. 20 to 25).

After the tape cassette 10 is inserted in the cassette holder (not shown) up to the above-described final insertion position, the cassette holder is moved (generally, downwardly) to a specific position, to load the tape cassette 10 at a specific loading position in the tape drive apparatus.

When the tape cassette 10 is loaded at the specific loading position of the tape drive apparatus, positioning pins 23l erected on a main chassis 230 of the tape drive apparatus are inserted in the positioning holes 35r and 35l of the tape cassette 10, to position the tape cassette 10 in the main chassis 230.

A detection switch 232 for detecting the presence or absence of the block piece 38 is provided in proximity to the left side of the right positioning pin 231. The presence or absence of the block piece 38 of the ID hole 36, that is, the ID hole 36 is detected by the detection switch 232, whereby preset specific information on the tape cassette 10 is decided by detection of the opening/closing of the ID hole 36.

An erroneous erasing preventing detection switch 233 is provided in proximity to the right side of the left positioning pin 231. The detection switch 233 detects whether the above-described erroneous erasing preventing detection hole 45 is opened or closed, to decide whether the tape cassette 10 is in the possible recording state or the impossible recording state. That is to say, when the erroneous erasing preventive tag (not shown) is located at a lower position, it closes the detection hole 45, and when the erroneous erasing preventive tag is located at an upper position, it opens the detection hole 45. Accordingly, the detection switch 233 can detect the opening/closing of the detection hole 45, to decide whether the tape cassette 10 is in the possible recording state or the impossible recording state.

After the tape cassette 10 is loaded at the specific loading position, reel bases (not shown) are inserted in the cassette shell 20 through the reel base insertion holes 23. Subsequently, the tape reels 40 and 50 are mounted on the reel bases, and the reel engagement shafts provided on the reel bases are engaged in the engagement holes 40a and 50a of the tape reels 40 and 50 and also a tape guide, an extraction guide, a pinch roller, and the like (not shown) are inserted in the mouth portion 21.

A light emission portion of a sensor for detecting the initial and terminal points of the magnetic tape 30 is inserted in the shading cylinder 25, and a light receiving portion of the sensor is disposed in proximity to the translucent cutouts 68 (which are overlapped to the translucent holes 25c of the cassette shell 20) of the front lid 60. The light emitting portion and the light receiving portion of the sensor are thus opposed to each other with the magnetic tape 30 put therebetween (see FIG. 9).

The magnetic tape 30 is then extracted from the cassette shell 20 by moving the tape guide, the extraction guide, the pinch roller, and the like (not shown). At the same time, while not shown, a rotary head drum 234 enters in the mouth portion 21, and the magnetic tape 30 is wound around the rotary head drum 234 at a specific winding angle in such a manner as to form a specific tape path.

Figure 27:
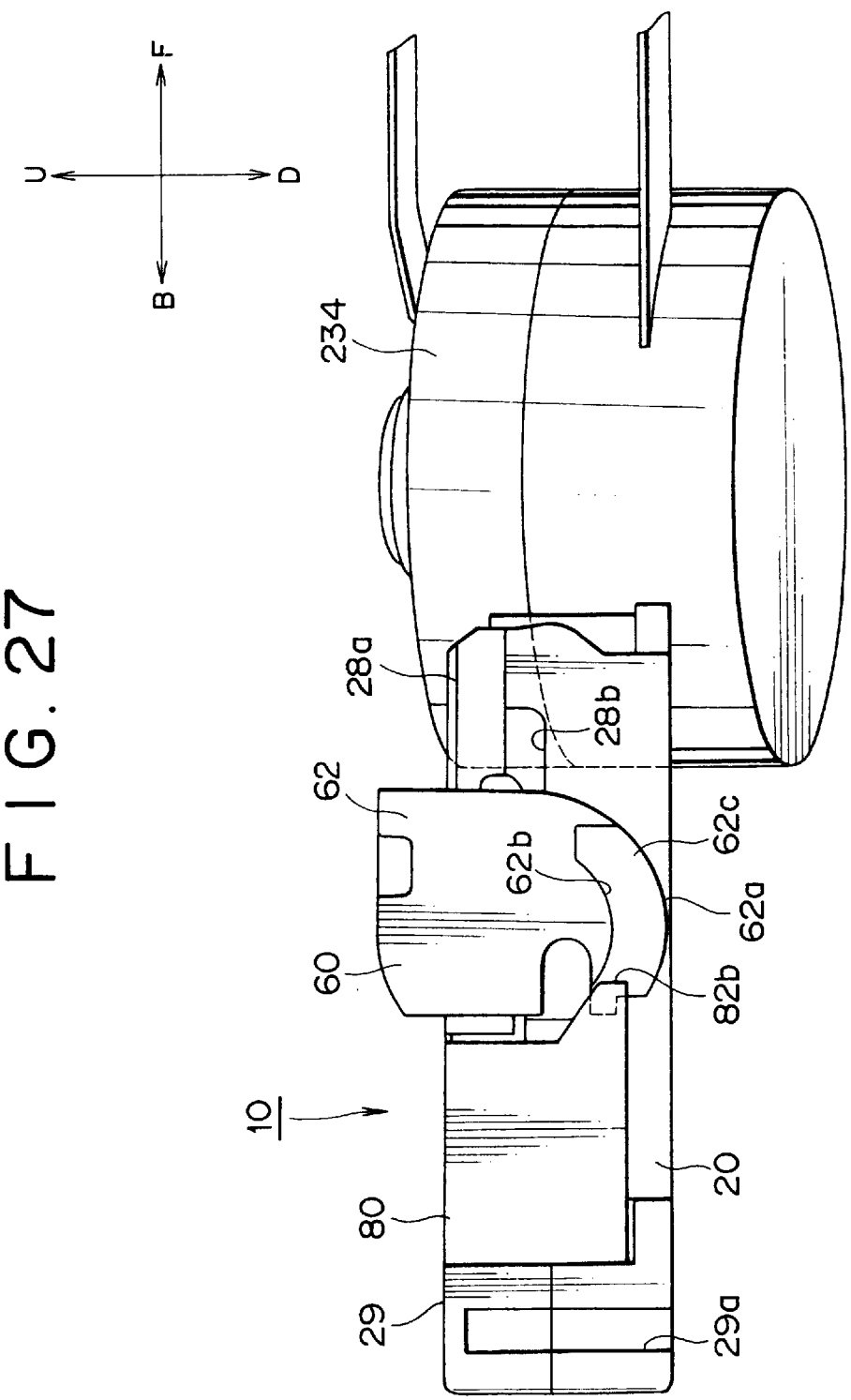
FIG. 27 is a schematic side view of the tape cassette, showing a state in which the tape cassette is loaded at a specific loading position in the tape drive apparatus.
Figure 28:
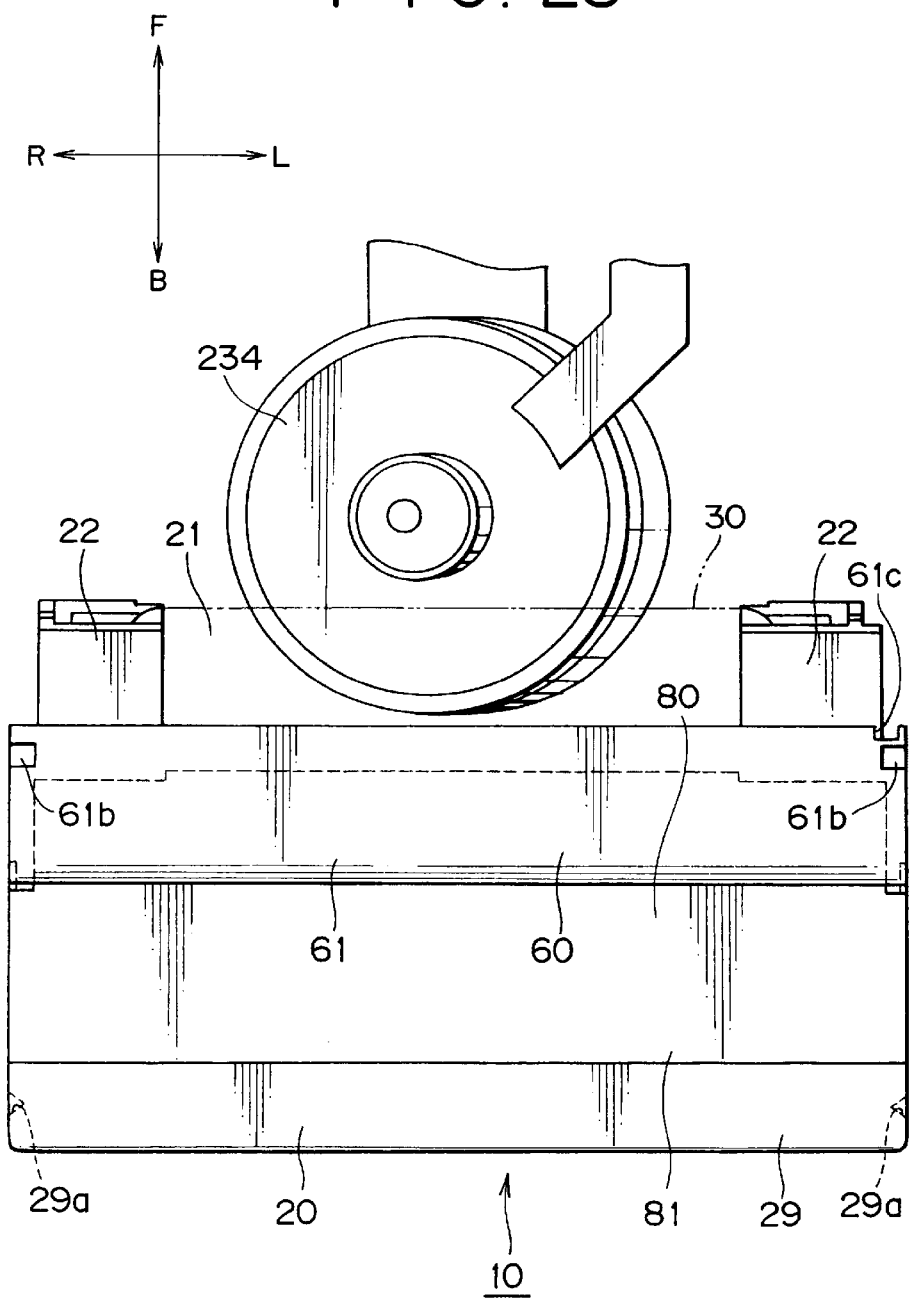
FIG. 28 is a schematic plan view of the tape cassette, showing a state in which the tape cassette is loaded at a specific loading position in the tape drive apparatus.

In this tape cassette 10, the upper side of the mouth portion 21 is opened, unlike a tape cassette of a type in which a front lid is simply turned upwardly to be opened or a tape cassette of a type in which a back lid is contained on the upper side of a mouth portion at the time of opening of the front lid. Accordingly, in this tape cassette 10, the rotary head drum 234 can be positioned in such a manner as to project from the upper surface of the mouth portion 21 (see FIG. 27), with a result that it is possible to enlarge the azimuth angle of each recording track by enlarging the tilt angle of the rotary head drum 234, and hence to increase the recording density with less crosstalk between the recording tracks.

After the recording or reproducing information on or from the magnetic tape 30 is ended, the members such as the tape guide, the extraction guide, and pinch roller are moved in the mouth portion 21, and the extra portion of the magnetic tape 30 is wound around the tape reel 40.

Figure 29:
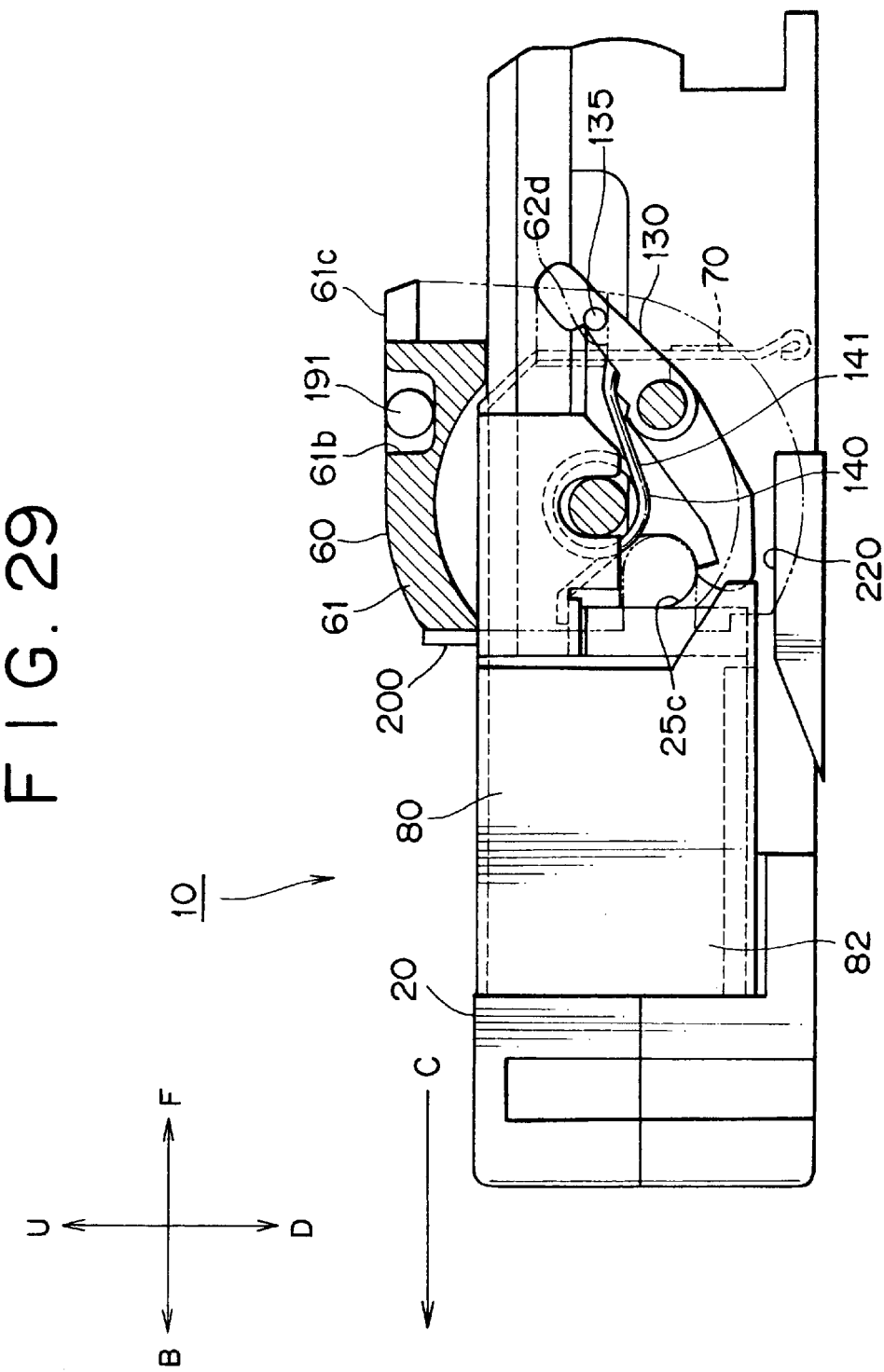
FIG. 29 is a schematic side view of the tape cassette, with an essential portion cutaway, showing a state in which the front lid is started to be pressed by a lid pressing projection.

The cassette holder is then returned to the above-described insertion ended position, and the tape cassette 10 is moved in the extraction direction, that is, in the direction C (see FIG. 29).

When the tape cassette 10 is moved in the direction C, the lid pressing projections 200 provided on the supporting members 180r and 180l press both sides of the upper end portions of the front surface portion 61 of the front lid 60 in the direction opposed to the direction C, whereby the front lid 60 and the slider 80 (together with the back lid 70) are moved toward the front end of the cassette shell 20.

Figure 30:
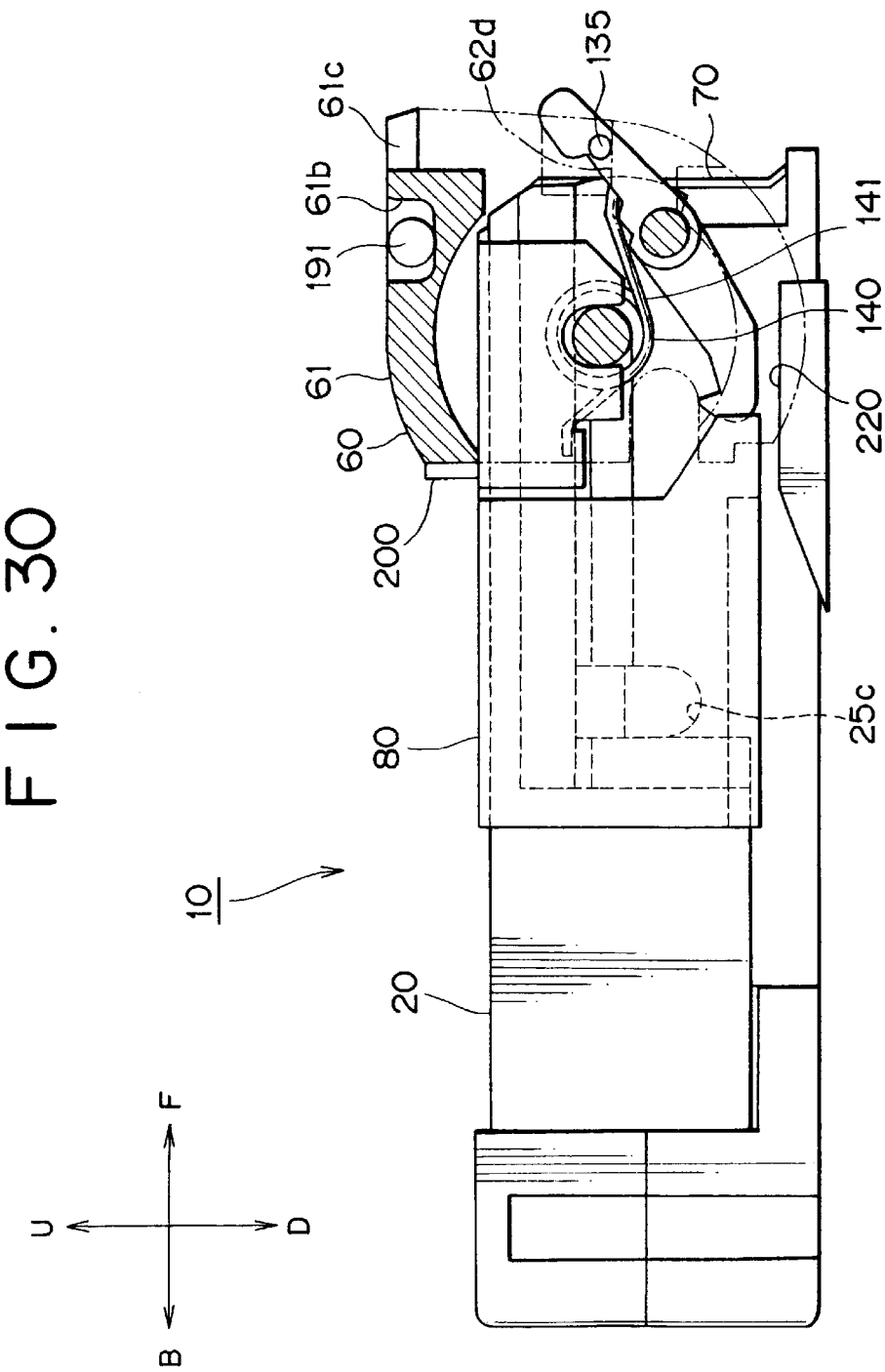
FIG. 30 is a schematic side view of the tape cassette, with an essential portion cutaway, showing a state in which the slider reaches the front limit of a movement range of the slider.

When the slider 80 reaches the front end of the movement range (see FIG. 30), the lower end portions 63a of the thick wall portions 63 of the front lid 60 are removed from the upper surface of the cassette shell 20, so that the front lid 60 is turnable downwardly. As a result, the front lid 60 is turned downwardly by the biasing force of the torsion-coil spring 140 applied thereto via the lid lock member 130, to reach the lid closing position, thereby covering the magnetic tape 30 in cooperation with the back lid 70 which has been moved forwardly. Subsequently, the locking claw 132 of the lid lock member 130 is engaged with the upper surface of the sliding projection 83b of the slider 80, to form the locking state of the front lid 60, and then the tape cassette 10 is extracted from the cassette holder (not shown).

While the preferred embodiment of the present invention has been described using specific terms, such description is for illustrative purposes only, and it is to be understood that changes and variations may be made without departing from the spirit or scope of the following claims.

What is claimed is:

1. A tape cassette comprising:
   a cassette shell which has, in the back surface, two positioning holes;
   wherein one of said two positioning holes is formed into a circular shape and the other is formed into a long-hole shape;
   an about half of said long-hole shaped positioning hole in the major direction of said long-hole is used as a positioning hole and an about remaining half thereof is used as an information detecting (ID) hole for providing various kinds of information; and
   a removable block piece is provided on an opening portion of said ID hole.

2. A tape cassette according to claim 1, wherein a connection piece is provided in such a manner as to connect an edge portion, on the side of said long-hole sided positioning hole, of said block piece to a bottom plate of said long-sided positioning hole.

3. A tape cassette according to claim 2, wherein a small piece is provided in such a manner as to connect the upper edge of said connection piece to the left edge of said bottom plate.

4. A tape cassette according to claim 3, wherein a very small piece is provided at the peripheral edge of said block piece for connecting said block piece to the left side inner peripheral edge of said long-hole.

5. A tape cassette according to claim 4, wherein a hole for screwing is provided in said bottom plate, positioned on the back surface side of said cassette shell, which is provided with said long-hole sided positioning hole.

6. A tape cassette according to claim 5, wherein said long-hole sided positioning hole is closer to the center of said bottom plate than said block piece does.

7. A tape cassette according to claim 6, wherein said long-hole sided positioning hole and said block piece are disposed in parallel to each other with respect to the long-side of said bottom plate.

* * * * *